US012739331B2

(12) United States Patent
Nakagoshi

(10) Patent No.: US 12,739,331 B2
(45) Date of Patent: Sep. 15, 2026

(54) DISPLAY INFORMATION GENERATION SYSTEM CAPABLE OF IMPROVING OPERABILITY IN IMAGE FORMING APPARATUS, AND REQUESTS SHORTCUT INFORMATION FOR ACCESSING FILE AND FOLDER

(71) Applicant: KYOCERA Document Solutions Inc., Osaka (JP)

(72) Inventor: Yusuke Nakagoshi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 238 days.

(21) Appl. No.: 18/672,346

(22) Filed: May 23, 2024

(65) Prior Publication Data

US 2024/0406321 A1 Dec. 5, 2024

(30) Foreign Application Priority Data

Jun. 5, 2023 (JP) ................................ 2023-092304

(51) Int. Cl.

| | |
|---|---|
| ***H04N 1/00*** | (2006.01) |
| *G06F 3/04817* | (2022.01) |
| *G06F 3/0482* | (2013.01) |
| *G06F 3/0485* | (2022.01) |

(52) U.S. Cl.

CPC ..... *H04N 1/00517* (2013.01); *H04N 1/00244* (2013.01); *H04N 1/00344* (2013.01); *H04N 1/00395* (2013.01); *H04N 1/00437* (2013.01); *H04N 1/00482* (2013.01); *H04N 1/00514* (2013.01); *G06F 3/04817* (2013.01); *G06F 3/0482* (2013.01); *G06F 3/0485* (2013.01)

(58) Field of Classification Search

None

See application file for complete search history.

(56) References Cited

U.S. PATENT DOCUMENTS

| | | | | |
|---|---|---|---|---|
| 8,482,763 | B2 * | 7/2013 | Suzuki | G06T 1/0007 358/1.15 |
| 2009/0282003 | A1 | 11/2009 | Hirata | |
| 2013/0135640 | A1 * | 5/2013 | Nagasaki | G06K 15/005 358/1.11 |

(Continued)

FOREIGN PATENT DOCUMENTS

| | | |
|---|---|---|
| JP | 2009295149 A | 12/2009 |

*Primary Examiner* — Haris Sabah

(74) *Attorney, Agent, or Firm* — Alleman Hall LLP

(57) ABSTRACT

A display information generation system includes a shortcut information acquisition portion and a display information generation portion. The shortcut information acquisition portion acquires, from a file management server, shortcut information for accessing at least one of a file and a folder managed by the file management server. The display information generation portion generates, based on the shortcut information acquired by the shortcut information acquisition portion, display information for causing an image forming apparatus to display a to-be-operated portion for causing the image forming apparatus to execute a file management server usage operation for using at least one of the file and the folder, for each combination of a target of a shortcut function out of the file and the folder and a type of the file management server usage operation.

13 Claims, 31 Drawing Sheets

(56) References Cited

U.S. PATENT DOCUMENTS

2013/0141743 A1* 6/2013 Miyazawa ........... H04N 1/0097
358/1.13
2014/0337928 A1* 11/2014 Hirakata ................. H04L 63/08
726/4
2019/0294386 A1* 9/2019 Iwamoto ............... G06F 3/1204

* cited by examiner

FIG.2A

| SHORTCUT NAME | FILE TYPE | IDENTIFIER | UPDATED DATE |
|---|---|---|---|
| FOLDER A | FOLDER | /doc/a | 2023/03/01 |
| FOLDER B | FOLDER | /doc/b | 2023/03/10 |
| FOLDER C | FILE | /doc/c | 2023/03/02 |

FIG.2B

| SHORTCUT NAME | FILE TYPE | IDENTIFIER | UPDATED DATE |
|---|---|---|---|
| D | FOLDER | 0000 | 2023/03/08 |
| E. txt | FILE | 2222 | 2023/03/07 |

FIG.2C

| SHORTCUT NAME | FILE TYPE | IDENTIFIER | UPDATED DATE |
|---|---|---|---|
| F | FOLDER | F | 2023/03/03 |
| G. dat | FILE | G | 2023/03/06 |

FIG.3

| CLOUD STORAGE NAME | SHORTCUT NAME | FILE TYPE | IDENTIFIER | UPDATED DATE | ACTION TYPE | ACTION PARAMETER |
|---|---|---|---|---|---|---|
| CLOUD STORAGE SERVICE 50 | FOLDER A | FOLDER | /doc/a | 2023/03/01 | FILE LIST DISPLAY OPERATION | DISPLAY NAME=OPEN |
| CLOUD STORAGE SERVICE 50 | FOLDER A | FOLDER | /doc/a | 2023/03/01 | SCAN SETTING SCREEN DISPLAY OPERATION | DISPLAY NAME=TO SCAN SETTING INITIAL SETTING=COLOR, A4, ONE SIDE |
| CLOUD STORAGE SERVICE 50 | FOLDER A | FOLDER | /doc/a | 2023/03/01 | IMMEDIATE SCAN OPERATION | DISPLAY NAME= SCAN NOW SETTING=COLOR, A4, ONE SIDE |
| CLOUD STORAGE SERVICE 50 | FILE C | FILE | /doc/c | 2023/03/02 | SAME-FOLDER FILE LIST DISPLAY OPERATION | DISPLAY NAME=OPEN FOLDER |
| CLOUD STORAGE SERVICE 50 | FILE C | FILE | /doc/c | 2023/03/02 | PRINT SETTING SCREEN DISPLAY OPERATION | DISPLAY NAME=TO PRINT SETTING INITIAL SETTING=COLOR, A4, ONE SIDE |
| CLOUD STORAGE SERVICE 50 | FILE C | FILE | /doc/c | 2023/03/02 | IMMEDIATE PRINT OPERATION | DISPLAY NAME= PRINT NOW SETTING=COLOR, A4, ONE SIDE |
| CLOUD STORAGE SERVICE 70 | F | FOLDER | F | 2023/03/03 | FILE LIST DISPLAY OPERATION | DISPLAY NAME=OPEN |
| CLOUD STORAGE SERVICE 70 | F | FOLDER | F | 2023/03/03 | SCAN SETTING SCREEN DISPLAY OPERATION | DISPLAY NAME=TO SCAN SETTING INITIAL SETTING=COLOR, A4, ONE SIDE |
| CLOUD STORAGE SERVICE 70 | F | FOLDER | F | 2023/03/03 | IMMEDIATE SCAN OPERATION | DISPLAY NAME= SCAN NOW SETTING=COLOR, A4, ONE SIDE |
| CLOUD STORAGE SERVICE 60 | E. txt | FILE | 2222 | 2023/03/07 | SAME-FOLDER FILE LIST DISPLAY OPERATION | DISPLAY NAME=OPEN FOLDER |
| CLOUD STORAGE SERVICE 60 | E. txt | FILE | 2222 | 2023/03/07 | PRINT SETTING SCREEN DISPLAY OPERATION | DISPLAY NAME=TO PRINT SETTING INITIAL SETTING=COLOR, A4, ONE SIDE |
| CLOUD STORAGE SERVICE 60 | E. txt | FILE | 2222 | 2023/03/07 | IMMEDIATE PRINT OPERATION | DISPLAY NAME= PRINT NOW SETTING=COLOR, A4, ONE SIDE |

| CLOUD STORAGE NAME | SHORTCUT NAME | FILE TYPE |
|---|---|---|
| Any | *.dat | Any |
| CLOUD STORAGE SERVICE 50 | FOLDER B | FOLDER |
| CLOUD STORAGE SERVICE 60 | Any | FOLDER |

FIG. 7

CONVERSION RULE INFORMATION 44e

| CLOUD STORAGE NAME | SHORTCUT NAME | FILE TYPE | ACTION TYPE | ACTION PARAMETER |
| --- | --- | --- | --- | --- |
| Any | Any | FOLDER | FILE LIST DISPLAY OPERATION | DISPLAY NAME = OPEN |
| Any | Any | FOLDER | SCAN SETTING SCREEN DISPLAY OPERATION | DISPLAY NAME=TO SCAN SETTING INITIAL SETTING=COLOR, A4, ONE SIDE |
| Any | Any | FOLDER | IMMEDIATE SCAN OPERATION | DISPLAY NAME= SCAN NOW SETTING=COLOR, A4, ONE SIDE |
| Any | Any | FILE | SAME-FOLDER FILE LIST DISPLAY OPERATION | DISPLAY NAME = OPEN FOLDER |
| Any | Any | FILE | PRINT SETTING SCREEN DISPLAY OPERATION | DISPLAY NAME=TO PRINT SETTING INITIAL SETTING=COLOR, A4, ONE SIDE |
| Any | Any | FILE | IMMEDIATE PRINT OPERATION | DISPLAY NAME= PRINT NOW SETTING=COLOR, A4, ONE SIDE |

FIG.11

| CLOUD STORAGE NAME | SHORTCUT NAME | FILE TYPE | IDENTIFIER | UPDATED DATE |
|---|---|---|---|---|
| CLOUD STORAGE SERVICE 50 | FOLDER A | FOLDER | /doc/a | 2023/03/01 |
| CLOUD STORAGE SERVICE 50 | FOLDER B | FOLDER | /doc/b | 2023/03/10 |
| CLOUD STORAGE SERVICE 50 | FOLDER C | FILE | /doc/c | 2023/03/02 |
| CLOUD STORAGE SERVICE 60 | D | FOLDER | 0000 | 2023/03/08 |
| CLOUD STORAGE SERVICE 60 | E.txt | FILE | 2222 | 2023/03/07 |
| CLOUD STORAGE SERVICE 70 | F | FOLDER | F | 2023/03/03 |
| CLOUD STORAGE SERVICE 70 | G.dat | FILE | G | 2023/03/06 |

FIG.12

| CLOUD STORAGE NAME | SHORTCUT NAME | FILE TYPE | IDENTIFIER | UPDATED DATE |
|---|---|---|---|---|
| CLOUD STORAGE SERVICE 50 | FOLDER A | FOLDER | /doc/a | 2023/03/01 |
| CLOUD STORAGE SERVICE 50 | FOLDER C | FILE | /doc/c | 2023/03/02 |
| CLOUD STORAGE SERVICE 60 | E. txt | FILE | 2222 | 2023/03/07 |
| CLOUD STORAGE SERVICE 70 | F | FOLDER | F | 2023/03/03 |

FIG.13

| CLOUD STORAGE NAME | SHORTCUT NAME | FILE TYPE | IDENTIFIER | UPDATED DATE | ACTION TYPE | ACTION PARAMETER |
|---|---|---|---|---|---|---|
| CLOUD STORAGE SERVICE 50 | FOLDER A | FOLDER | /doc/a | 2023/03/01 | FILE LIST DISPLAY OPERATION | DISPLAY NAME = OPEN |
| CLOUD STORAGE SERVICE 50 | FOLDER A | FOLDER | /doc/a | 2023/03/01 | SCAN SETTING SCREEN DISPLAY OPERATION | DISPLAY NAME=TO SCAN SETTING INITIAL SETTING=COLOR, A4, ONE SIDE |
| CLOUD STORAGE SERVICE 50 | FOLDER A | FOLDER | /doc/a | 2023/03/01 | IMMEDIATE SCAN OPERATION | DISPLAY NAME= SCAN NOW SETTING=COLOR, A4, ONE SIDE |
| CLOUD STORAGE SERVICE 50 | FILE C | FILE | /doc/c | 2023/03/02 | SAME-FOLDER FILE LIST DISPLAY OPERATION | DISPLAY NAME = OPEN FOLDER |
| CLOUD STORAGE SERVICE 50 | FILE C | FILE | /doc/c | 2023/03/02 | PRINT SETTING SCREEN DISPLAY OPERATION | DISPLAY NAME=TO PRINT SETTING INITIAL SETTING=COLOR, A4, ONE SIDE |
| CLOUD STORAGE SERVICE 50 | FILE C | FILE | /doc/c | 2023/03/02 | IMMEDIATE PRINT OPERATION | DISPLAY NAME= PRINT NOW SETTING=COLOR, A4, ONE SIDE |
| CLOUD STORAGE SERVICE 60 | E. txt | FILE | 2222 | 2023/03/07 | SAME-FOLDER FILE LIST DISPLAY OPERATION | DISPLAY NAME = OPEN FOLDER |
| CLOUD STORAGE SERVICE 60 | E. txt | FILE | 2222 | 2023/03/07 | PRINT SETTING SCREEN DISPLAY OPERATION | DISPLAY NAME=TO PRINT SETTING INITIAL SETTING=COLOR, A4, ONE SIDE |
| CLOUD STORAGE SERVICE 60 | E. txt | FILE | 2222 | 2023/03/07 | IMMEDIATE PRINT OPERATION | DISPLAY NAME= PRINT NOW SETTING=COLOR, A4, ONE SIDE |
| CLOUD STORAGE SERVICE 70 | F | FOLDER | F | 2023/03/03 | FILE LIST DISPLAY OPERATION | DISPLAY NAME = OPEN |
| CLOUD STORAGE SERVICE 70 | F | FOLDER | F | 2023/03/03 | SCAN SETTING SCREEN DISPLAY OPERATION | DISPLAY NAME=TO SCAN SETTING INITIAL SETTING=COLOR, A4, ONE SIDE |
| CLOUD STORAGE SERVICE 70 | F | FOLDER | F | 2023/03/03 | IMMEDIATE SCAN OPERATION | DISPLAY NAME= SCAN NOW SETTING=COLOR, A4, ONE SIDE |

DISPLAY INFORMATION GENERATION SYSTEM CAPABLE OF IMPROVING OPERABILITY IN IMAGE FORMING APPARATUS, AND REQUESTS SHORTCUT INFORMATION FOR ACCESSING FILE AND FOLDER

INCORPORATION BY REFERENCE

This application is based upon and claims the benefit of priority from the corresponding Japanese Patent Application No. 2023-092304 filed on Jun. 5, 2023, the entire contents of which are incorporated herein by reference.

BACKGROUND

The present disclosure relates to a display information generation system which generates display information for causing an image forming apparatus to display a to-be-operated portion, computer-readable storage medium, and an image forming system.

From the past, there are known a file management server which provides, as well as manage files and folders, a place as a function for enabling easier access to the files managed by itself than a normal access method, and an image forming apparatus which displays the place notified from the file management server on a liquid crystal touch panel.

SUMMARY

A display information generation system according to the present disclosure includes a shortcut information acquisition portion and a display information generation portion. The shortcut information acquisition portion acquires, from a file management server having a shortcut function, shortcut information as information for accessing at least one of a file and a folder managed by the file management server using the shortcut function. The display information generation portion generates, based on the shortcut information acquired by the shortcut information acquisition portion, display information as information for causing an image forming apparatus to display a to-be-operated portion for causing the image forming apparatus to execute a file management server usage operation as an operation for using at least one of the file and the folder, for each combination of a target of the shortcut function out of the file and the folder and a type of the file management server usage operation.

A computer-readable storage medium according to the present disclosure stores a display information generation program. The display information generation program causes a computer to realize a shortcut information acquisition portion and a display information generation portion. The shortcut information acquisition portion acquires, from a file management server having a shortcut function, shortcut information as information for accessing at least one of a file and a folder managed by the file management server using the shortcut function. The display information generation portion generates, based on the shortcut information acquired by the shortcut information acquisition portion, display information as information for causing an image forming apparatus to display a to-be-operated portion for causing the image forming apparatus to execute a file management server usage operation as an operation for using at least one of the file and the folder, for each combination of a target of the shortcut function out of the file and the folder and a type of the file management server usage operation.

An image forming system according to the present disclosure includes an image forming apparatus, a shortcut information acquisition portion, and a display information generation portion. The shortcut information acquisition portion acquires, from a file management server having a shortcut function, shortcut information as information for accessing at least one of a file and a folder managed by the file management server using the shortcut function. The display information generation portion generates, based on the shortcut information acquired by the shortcut information acquisition portion, display information as information for causing the image forming apparatus to display a to-be-operated portion for causing the image forming apparatus to execute a file management server usage operation as an operation for using at least one of the file and the folder. The image forming apparatus displays the to-be-operated portion for each combination of a target of the shortcut function out of the file and the folder and a type of the file management server usage operation based on the display information generated by the display information generation portion.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2A is a diagram showing an example of shortcut information notified to a display information generation system from one of cloud storage services shown in FIG. 1;

FIG. 2B is a diagram showing an example of the shortcut information notified to the display information generation system from one of the cloud storage services shown in FIG. 1 that is different from the cloud storage service of FIG. 2A;

FIG. 2C is a diagram showing an example of the shortcut information notified to the display information generation system from one of the cloud storage services shown in FIG. 1 that is different from the cloud storage services of FIG. 2A and FIG. 2B;

FIG. 3 is a diagram showing an example of action button display information generated by the display information generation system shown in FIG. 1;

FIG. 7 is a diagram showing an example of conversion rule information shown in FIG. 5;

FIG. 11 is a diagram showing an example of the shortcut information aggregated by the display information generation system shown in FIG. 5;

FIG. 12 is a diagram showing an example of the shortcut information from which shortcut information not used for generating the action button display information has been excluded by the display information generation system shown in FIG. 5;

FIG. 13 is a diagram showing an example of the action button display information obtained by converting the shortcut information by the display information generation system shown in FIG. 5;

DETAILED DESCRIPTION

Hereinafter, an embodiment of the present disclosure will be described with reference to the drawings.

First, a configuration of a system according to the embodiment of the present disclosure will be described.

Figure 1:
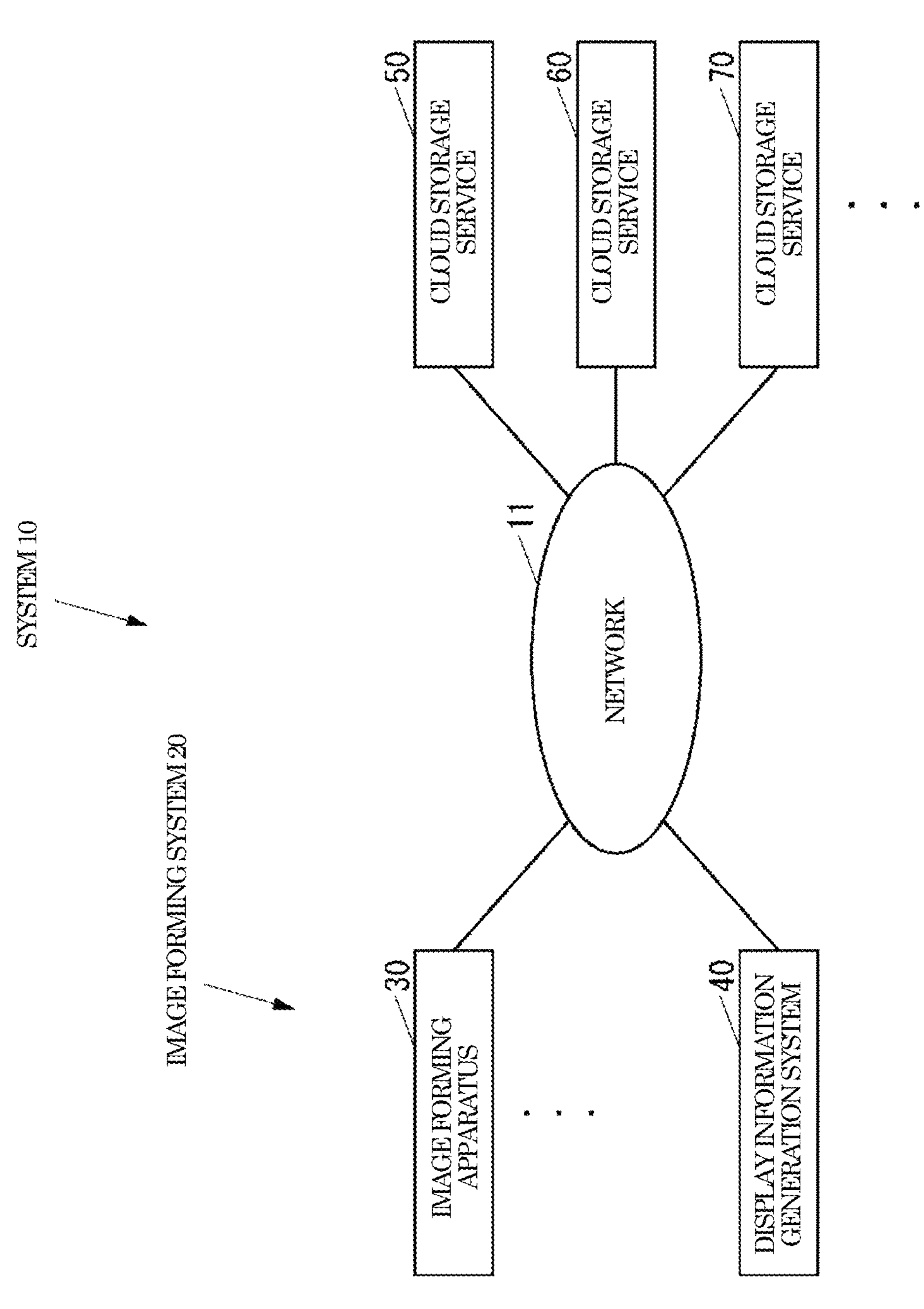
FIG. 1 is a block diagram of a system according to an embodiment of the present disclosure.

FIG. 1 is a block diagram of a system 10 according to the present embodiment.

As shown in FIG. 1, the system 10 includes an image forming system 20 for forming an image.

The image forming system 20 includes an image forming apparatus 30 such as an MFP (Multifunction Peripheral) and a printer-dedicated machine. The image forming system 20 can be provided with at least one image forming apparatus similar to the image forming apparatus 30 in addition to the image forming apparatus 30.

The image forming system 20 includes a display information generation system 40 which generates display information (hereinafter, will be referred to as "action button display information") as information for causing the image forming apparatus to display a to-be-operated portion (hereinafter, will be referred to as an "action button") for causing the image forming apparatus to execute a cloud storage service usage operation (hereinafter, will be referred to as an "action") as an operation for using at least one of a file and a folder managed by a cloud storage service as a file management server which manages files and folders. The display information generation system 40 may be configured by a single computer, or may be configured by a plurality of computers.

The system 10 includes a cloud storage service 50, a cloud storage service 60, and a cloud storage service 70. The system 10 can be provided with at least one cloud storage service which manages files and folders in addition to the cloud storage services 50, 60, and 70. As the cloud storage service, for example, "Box" provided by "Box, Inc.", "Google Drive" provided by "Google LLC", "Microsoft Sharepoint Online" provided by "Microsoft Corporation", "Microsoft OneDrive" provided by "Microsoft Corporation", or the like can be adopted.

The image forming apparatus, the display information generation system 40, and the cloud storage services are communicable with one another via a network 11 such as the Internet. The image forming apparatus and the display information generation system 40 may be communicable with each other via a network other than the Internet, such as a LAN (Local Area Network), for example.

The files and folders managed by the cloud storage services can not only be accessed from the image forming apparatus but can also be accessed from various electronic devices such as a PC (Personal Computer) and a smart device, for example.

Incidentally, there are known a file management server which provides, as well as manage files and folders, a place as a function for enabling easier access to the files managed by itself than a normal access method, and an image forming apparatus which displays the place notified from the file management server on a liquid crystal touch panel.

Herein, in the conventional image forming apparatus, when uploading a file generated by scanning to a place on the file management server, a user needs to select a place displayed on the liquid crystal touch panel and then input a scan instruction, thus resulting in a problem that the number of operations becomes large. In addition, in the conventional image forming apparatus, also when displaying a file included in a place on the liquid crystal touch panel, the user needs to select the place displayed on the liquid crystal touch panel and then input a download instruction, thus resulting in a problem that the number of operations becomes large.

In contrast, in the display information generation system 40 according to the embodiment of the present disclosure, an operability in the image forming apparatus can be improved as will be described below.

The cloud storage service has a shortcut function as a function for enabling easier access to at least one of the file and the folder managed by itself than a normal access method. As the shortcut function, for example, there is a "favorite" function for designating, by the user, a file or a folder that the user wishes to be capable of accessing more easily than in the normal access method out of the files and folders managed by the cloud storage service. In addition, as the shortcut function, for example, there is also a function in which the cloud storage service automatically manages files that the user has recently accessed in time series out of the files managed by the cloud storage service.

The cloud storage service is capable of notifying the display information generation system 40 of shortcut information as information for accessing a target of the shortcut function out of the files and folders managed by the cloud storage service itself using the shortcut function. The shortcut information exists for each target of the shortcut function out of the files and folders.

FIG. 2A is a diagram showing an example of the shortcut information notified to the display information generation system 40 from the cloud storage service 50. FIG. 2B is a diagram showing an example of the shortcut information notified to the display information generation system 40 from the cloud storage service 60. FIG. 2C is a diagram showing an example of the shortcut information notified to the display information generation system 40 from the cloud storage service 70.

As shown in FIG. 2A to 2C, the shortcut information shows, for each target of the shortcut function, a "shortcut name" as identification information of the target of the shortcut function out of the files and folders managed by the cloud storage service, a "file type" indicating which of a file and a folder the target of the shortcut function is, an "identifier" used for the cloud storage service to identify the target of the shortcut function, and an "updated date" as an updated date of the shortcut information in the cloud storage service.

FIG. 3 is a diagram showing an example of action button display information generated by the display information generation system 40.

As shown in FIG. 3, the action button display information is information in which a name of the cloud storage service (hereinafter, will be referred to as a "cloud storage name") managing a file or a folder as a target of the action button, a "shortcut name" of the target of the action button, a "file type" of the file or the folder as the target of the action button, an "identifier" of the file or the folder as the target of the action button, an "updated date" as an updated date of the shortcut information of the target of the action button in the cloud storage service, an "action type" of the target of the action button, and various parameters of the action (hereinafter, will be referred to as "action parameters") of the target of the action button are associated with one another. The action button display information exists for each combination of the target of the shortcut function out of the files and folders managed by the cloud storage service and the action type.

In the present embodiment, the cloud storage names of the cloud storage service 50, the cloud storage service 60, and the cloud storage service 70 are "cloud storage service 50", "cloud storage service 60", and "cloud storage service 70", respectively.

As the action type, when a target of the shortcut information is a file, there is a "same-folder file list display operation" as an operation for displaying a screen that shows a list of folders and files immediately below a folder immediately above the file that is the target of the shortcut information in the cloud storage service (hereinafter, the screen showing the list of folders and files will be referred to as a "file list screen"). As a type of the action parameter of the "same-folder file list display operation", there is, for example, a "display name" of the action button in a home screen in the case of using the cloud storage service (hereinafter, will simply be referred to as the "home screen"). The "display name" of the "same-folder file list display operation" is, for example, "open file".

As the action type, when the target of the shortcut information is a file, there is a "print setting screen display operation" as an operation for displaying a screen that accepts setting values for printing of the file that is the target of the shortcut information (hereinafter, will be referred to as a "print setting screen"). As a type of the action parameter of the "print setting screen display operation", there are, for example, a "display name" of the action button in the home screen and an "initial setting" indicating initial values of the setting values for printing in the print setting screen. The "display name" of the "print setting screen display operation" is, for example, "to print setting". As the "initial setting" of the "print setting screen display operation", for example, "color" indicating color printing is designated as an initial value of the setting value with respect to "color/monochrome" which is a setting item indicating which of color printing and monochrome printing is to be executed, "A4" indicating an A4 size is designated as an initial value of the setting value with respect to a "paper sheet size" which is a setting item indicating a size of a printing medium, and "one-side" indicating one-side printing is designated as an initial value of the setting value with respect to "duplex/one-side" which is a setting item indicating which of duplex printing and one-side printing is to be executed.

As the action type, when the target of the shortcut information is a file, there is an "immediate print operation" as an operation for downloading the file that is the target of the shortcut information from the cloud storage service and printing the file downloaded from the cloud storage service using predetermined setting values for printing. As a type of the action parameter of the "immediate print operation", there are, for example, a "display name" of the action button in the home screen and a "setting" indicating the setting values for printing. The "display name" of the "immediate print operation" is, for example, "print now". As the "setting" of the "immediate print operation", for example, "color" indicating color printing is designated as the setting value with respect to "color/monochrome" which is a setting item indicating which of color printing and monochrome printing is to be executed, "A4" indicating the A4 size is designated as the setting value with respect to a "paper sheet size" which is a setting item indicating a size of a printing medium, and "one-side" indicating one-side printing is designated as the setting value with respect to "duplex/one-side" which is a setting item indicating which of duplex printing and one-side printing is to be executed.

As the action type, when the target of the shortcut information is a folder, there is a "file list display operation" as an operation for displaying a file list screen that shows a list of folders and files immediately below the folder that is the target of the shortcut information in the cloud storage service. As a type of the action parameter of the "file list display operation", there is, for example, a "display name" of the action button in the home screen. The "display name" of the "file list display operation" is, for example, "open".

As the action type, when the target of the shortcut information is a folder, there is a "scan setting screen display operation" as an operation for displaying a screen that accepts setting values for scanning for generating a file to be uploaded to the folder that is the target of the shortcut information (hereinafter, will be referred to as a "scan setting screen"). As a type of the action parameter of the "scan setting screen display operation", there are, for example, a "display name" of the action button in the home screen and an "initial setting" indicating initial values of the setting values for scanning in the scan setting screen. The "display name" of the "scan setting screen display operation" is, for example, "to scan setting". As the "initial setting" of the "scan setting screen display operation", for example, "color" indicating color scanning is designated as an initial value of the setting value with respect to "color/monochrome" which is a setting item indicating which of color scanning and monochrome scanning is to be executed, "A4" indicating the A4 size is designated as an initial value of the setting value with respect to a "document sheet size" which is a setting item indicating a size of a scanning medium, and "one-side" indicating one-side scanning is designated as an initial value of the setting value with respect to "duplex/one-side" which is a setting item indicating which of duplex scanning and one-side scanning is to be executed.

As the action type, when the target of the shortcut information is a folder, there is an "immediate scan operation" as an operation for performing scanning using predetermined setting values for scanning and uploading a file generated by the scanning to the folder that is the target of the shortcut information. As a type of the action parameter of the "immediate scan operation", there are, for example, a "display name" of the action button in the home screen and a "setting" indicating the setting values for scanning. The "display name" of the "immediate scan operation" is, for example, "scan now". As the "setting" of the "immediate scan operation", for example, "color" indicating color scanning is designated as the setting value with respect to "color/monochrome" which is a setting item indicating which of color scanning and monochrome scanning is to be executed, "A4" indicating the A4 size is designated as the setting value with respect to a "document sheet size" which is a setting item indicating a size of a scanning medium, and "one-side" indicating one-side scanning is designated as the setting value with respect to "duplex/one-side" which is a setting item indicating which of duplex scanning and one-side scanning is to be executed.

Figure 4:
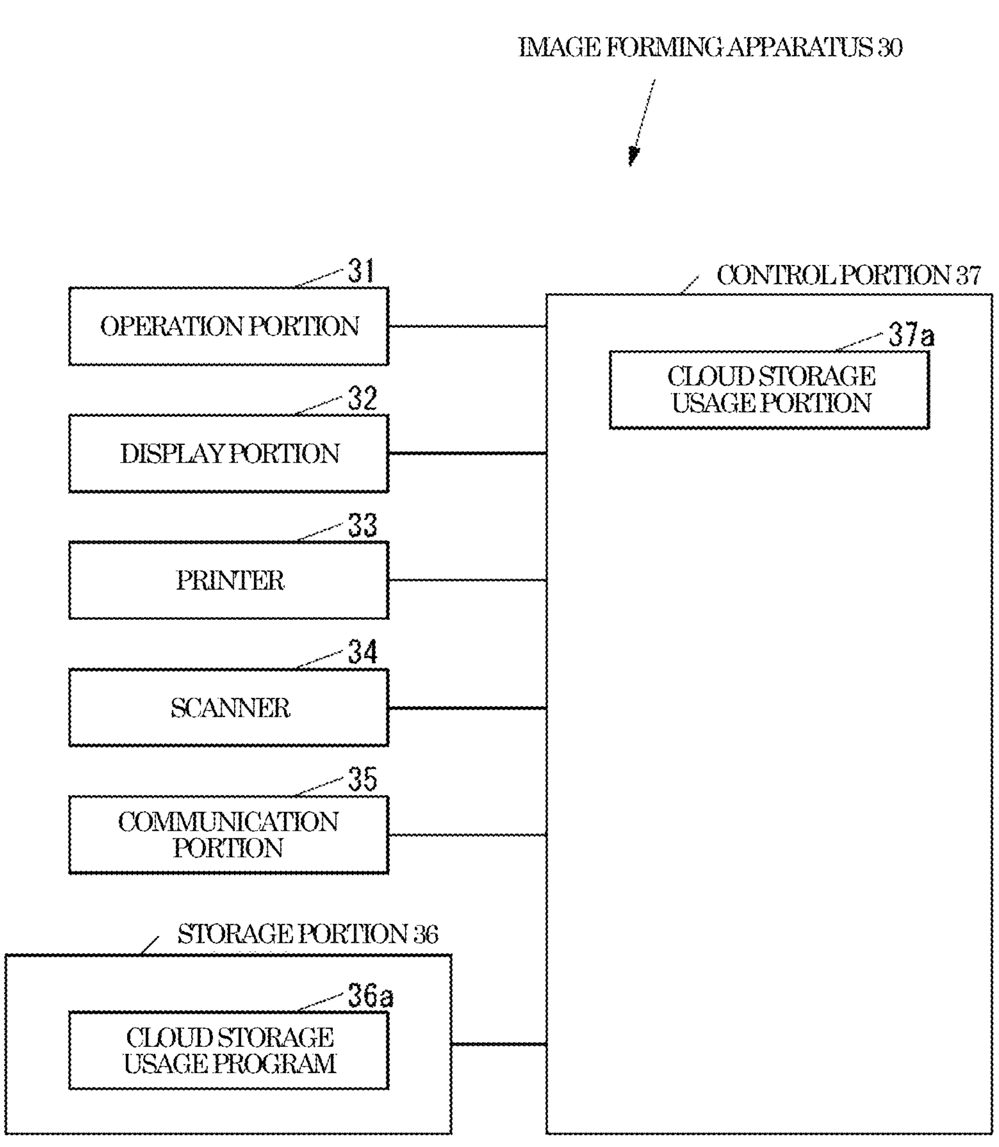
FIG. 4 is a block diagram of an image forming apparatus shown in FIG. 1 in a case where the image forming apparatus is an MFP.

FIG. 4 is a block diagram of the image forming apparatus 30 in a case where the image forming apparatus 30 is an MFP.

As shown in FIG. 4, the image forming apparatus 30 includes an operation portion 31 which is, for example, an operation device such as a button to which various operations are input, a display portion 32 which is, for example, a display device such as an LCD (Liquid Crystal Display) which displays various types of information, a printer 33 which is a printing device which prints an image on a recording medium such as a paper sheet, a scanner 34 which is a reading device which reads an image from a document sheet, a communication portion 35 which is a communication device which performs direct wired or wireless communication with an external apparatus via a network such as a LAN and the Internet or without using the network, a storage portion 36 which is, for example, a nonvolatile storage device such as a semiconductor memory and an HDD (Hard Disk Drive) which stores various types of information, and a control portion 37 which controls the entire image forming apparatus 30.

The storage portion 36 is capable of storing a cloud storage usage program **36*a* for using the cloud storage service. For example, the cloud storage usage program 36*a* may be installed in the image forming apparatus 30 in a manufacturing stage of the image forming apparatus 30, may be additionally installed in the image forming apparatus 30 from an external storage medium such as a USB (Universal Serial Bus) memory, or may be additionally installed in the image forming apparatus 30** from the network.

The control portion 37 includes, for example, a CPU (Central Processing Unit), a ROM (Read Only Memory) which stores programs and various types of data, and a RAM (Random Access Memory) as a memory that is used as a working area of the CPU of the control portion 37. The CPU of the control portion 37 executes the programs stored in the storage portion 36 or the ROM of the control portion 37.

The control portion 37 executes the cloud storage usage program **36*a* to realize a cloud storage usage portion 37*a*** which uses the cloud storage service.

Figure 5:
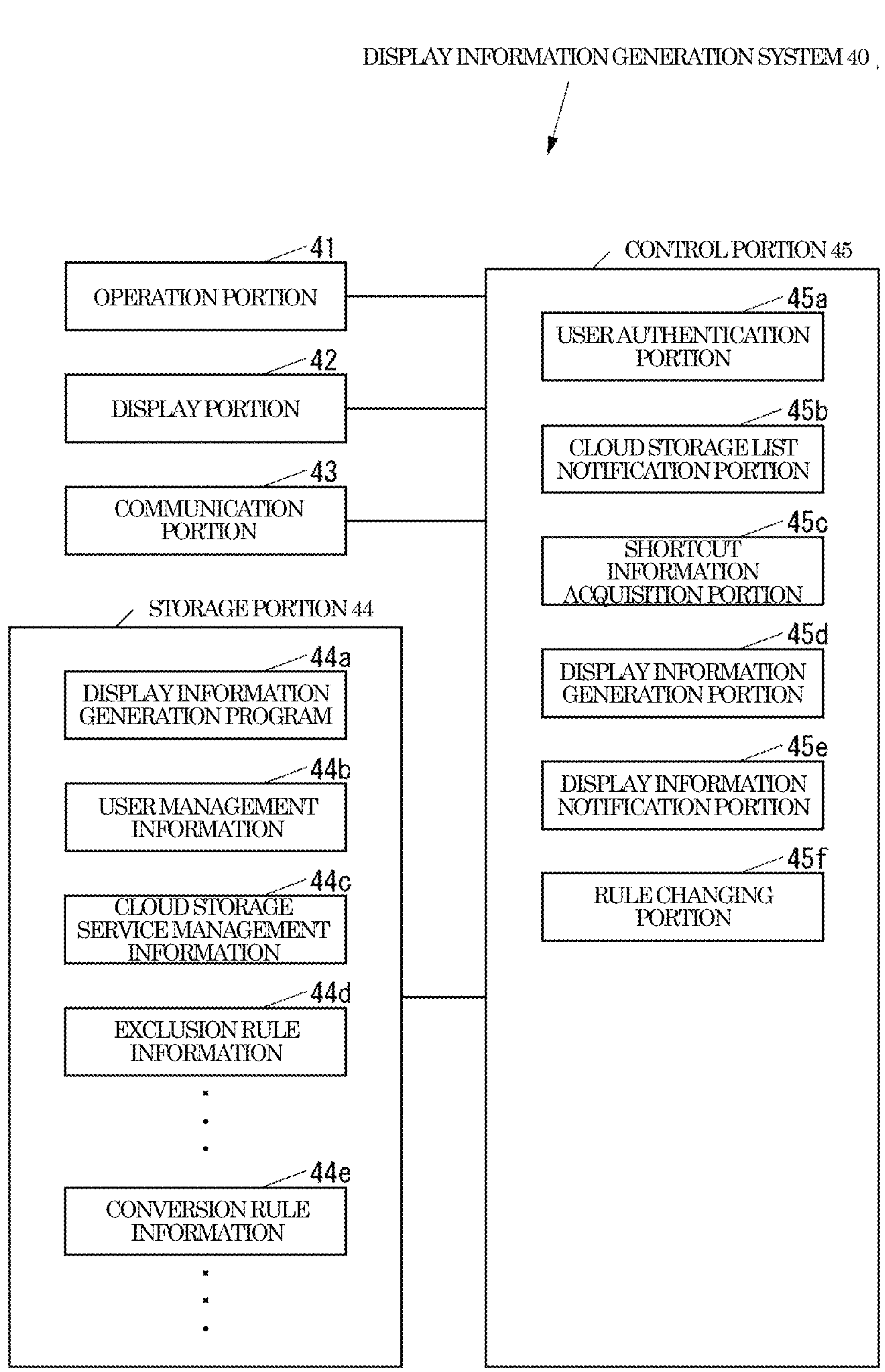
FIG. 5 is a block diagram of the display information generation system shown in FIG. 1 in a case where the display information generation system is configure by a single computer.

FIG. 5 is a block diagram of the display information generation system 40 in a case where the display information generation system 40 is configured by a single computer.

As shown in FIG. 5, the display information generation system 40 includes an operation portion 41 which is, for example, an operation device such as a keyboard and a mouse to which various operations are input, a display portion 42 which is, for example, a display device such as an LCD which displays various types of information, a communication portion 43 which is a communication device which performs direct wired or wireless communication with an external apparatus via a network such as a LAN and the Internet or without using the network, a storage portion 44 which is, for example, a nonvolatile storage device such as a semiconductor memory and an HDD which stores various types of information, and a control portion 45 which controls the entire display information generation system 40.

The storage portion 44 is capable of storing a display information generation program **44*a* for generating display information. For example, the display information generation program 44*a* may be installed in the display information generation system 40 in a manufacturing stage of the display information generation system 40, may be additionally installed in the display information generation system 40 from an external storage medium such as a USB memory, or may be additionally installed in the display information generation system 40** from the network.

The storage portion 44 stores user management information **44*b*** that includes, for each user, a combination of a user name as identification information of the user and a password of the user.

The storage portion 44 stores cloud storage service management information **44*c*** that includes a list of cloud storage services for each user.

The storage portion 44 is capable of storing, for each user, exclusion rule information that includes at least one exclusion rule as a rule for excluding shortcut information not used for generating action button display information from the shortcut information acquired from the cloud storage service. For example, the storage portion 44 stores exclusion rule information 44*d*.

Figure 6:
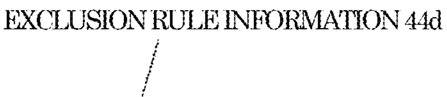
FIG. 6 is a diagram showing an example of exclusion rule information shown in FIG. 5.

FIG. 6 is a diagram showing an example of the exclusion rule information 44*d*.

As shown in FIG. 6, the exclusion rule included in the exclusion rule information 44*d* is obtained by combining a condition of a cloud storage name of a cloud storage service that is an acquisition destination of the shortcut information not used for generating the action button display information, a condition of a shortcut name of the shortcut information not used for generating the action button display information, and a condition of a file type of the shortcut information not used for generating the action button display information. The exclusion rule information 44*d* shown in FIG. 6 includes, for example, an exclusion rule in which the cloud storage name is "Any", that is, arbitrary, the shortcut name is "*.dat", that is, ends with ".dat", and the file type is "Any", that is, arbitrary, an exclusion rule in which the cloud storage name is "cloud storage service 50", the shortcut name is "folder B", and the file type is "folder", and an exclusion rule in which the cloud storage name is "cloud storage service 60", the shortcut name is "Any", that is, arbitrary, and the file type is "folder".

As shown in FIG. 5, the storage portion 44 is capable of storing, for each user, conversion rule information that includes at least one conversion rule as a rule for converting shortcut information into action button display information. For example, the storage portion 44 stores conversion rule information 44*e*.

FIG. 7 is a diagram showing an example of the conversion rule information 44*e*.

As shown in FIG. 7, the conversion rule included in the conversion rule information 44*e* shows a correspondence relationship among a combination of a condition of a cloud storage name of a cloud storage service that is an acquisition destination of the shortcut information, a condition of a shortcut name of the shortcut information, and a condition of a file type of the shortcut information, an action type, and an action parameter of the action. The conversion rule information 44*e* shown in FIG. 7 includes, for example, a conversion rule in which the cloud storage name is "Any", that is, arbitrary, the shortcut name is "Any", that is, arbitrary, the file type is "folder", the action type is "file list display operation", and the "display name" as the action parameter of the action is "open".

The control portion 45 includes, for example, a CPU, a ROM which stores programs and various types of data, and a RAM as a volatile storage device that is used as a working area of the CPU of the control portion 45. The CPU of the control portion 45 executes the programs stored in the storage portion 44 or the ROM of the control portion 45.

The control portion 45 executes the display information generation program 44*a* to realize a user authentication portion 45*a* which executes user authentication, a cloud storage list notification portion 45*b* which notifies the image forming apparatus 30 of the list of cloud storage services, a shortcut information acquisition portion 45*c* which acquires shortcut information from the cloud storage service, a display information generation portion 45*d* which generates action button display information based on the shortcut information acquired by the shortcut information acquisition portion 45*c*, a display information notification portion 45*e* which notifies the image forming apparatus 30 of the action button display information generated by the display information generation portion 45*d*, and a rule changing portion 45*f* which changes the exclusion rule information and the conversion rule information.

Next, operations of the system 10 will be described.

In descriptions below, the image forming apparatus 30 will be described representing the image forming apparatuses. In addition, the cloud storage services 50, 60, and 70 will be described representing the cloud storage services.

First, operations of the system 10 in a case where the image forming apparatus 30 displays a home screen will be described.

Figure 8:
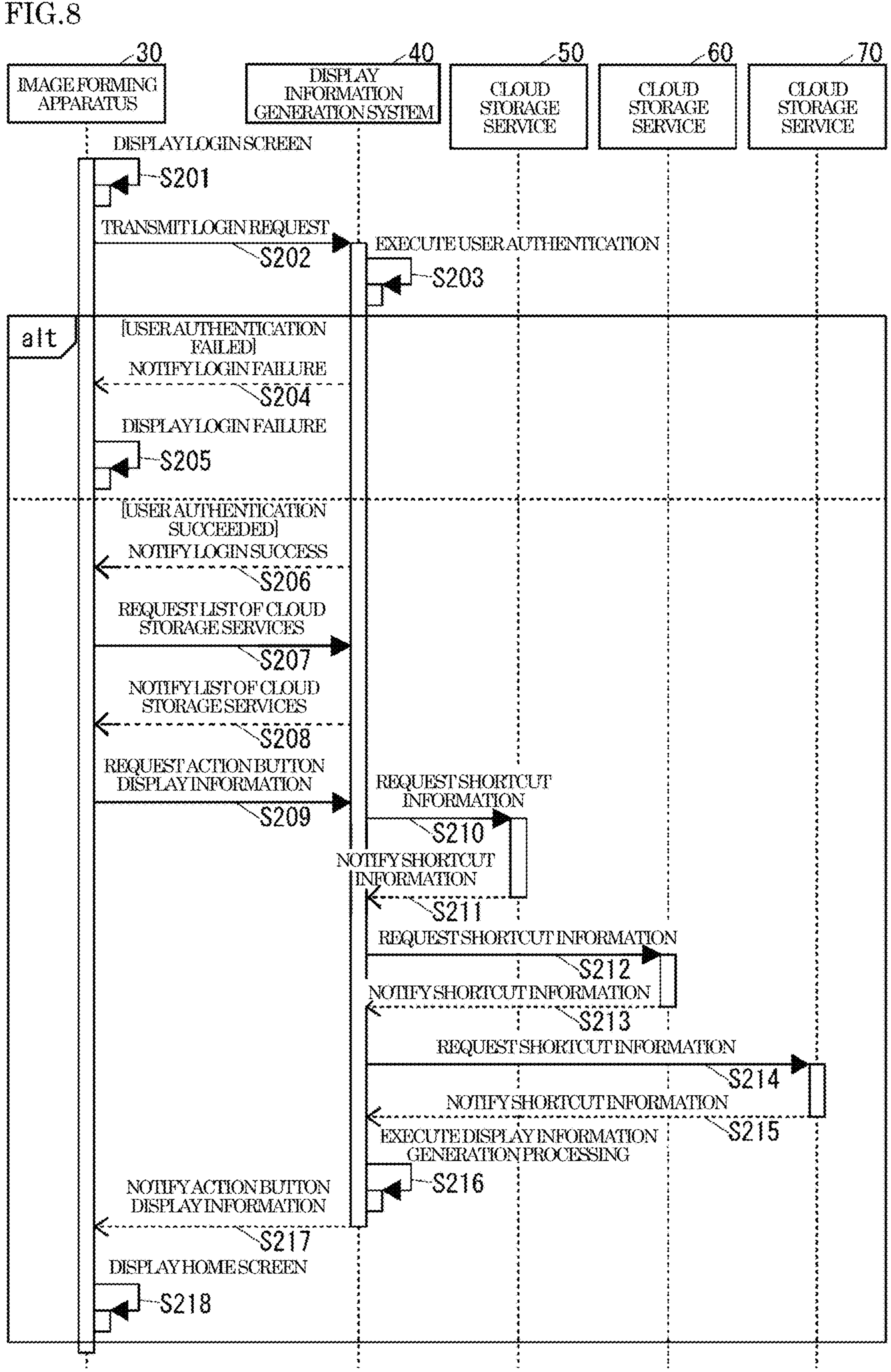
FIG. 8 is an operation sequence diagram of the system shown in FIG. 1 in a case where the image forming apparatus displays a home screen.

FIG. 8 is an operation sequence diagram of the system 10 in the case where the image forming apparatus 30 displays the home screen.

The user can instruct the image forming apparatus 30 to display the home screen via the operation portion 31 of the image forming apparatus 30. When instructed by the user to display the home screen, the cloud storage usage portion 37*a* of the image forming apparatus 30 displays, on the display portion 32, a screen (hereinafter, will be referred to as a "login screen") 100 for prompting the user to log in (see FIG. 9) as shown in FIG. 8 (S201).

Figure 9:
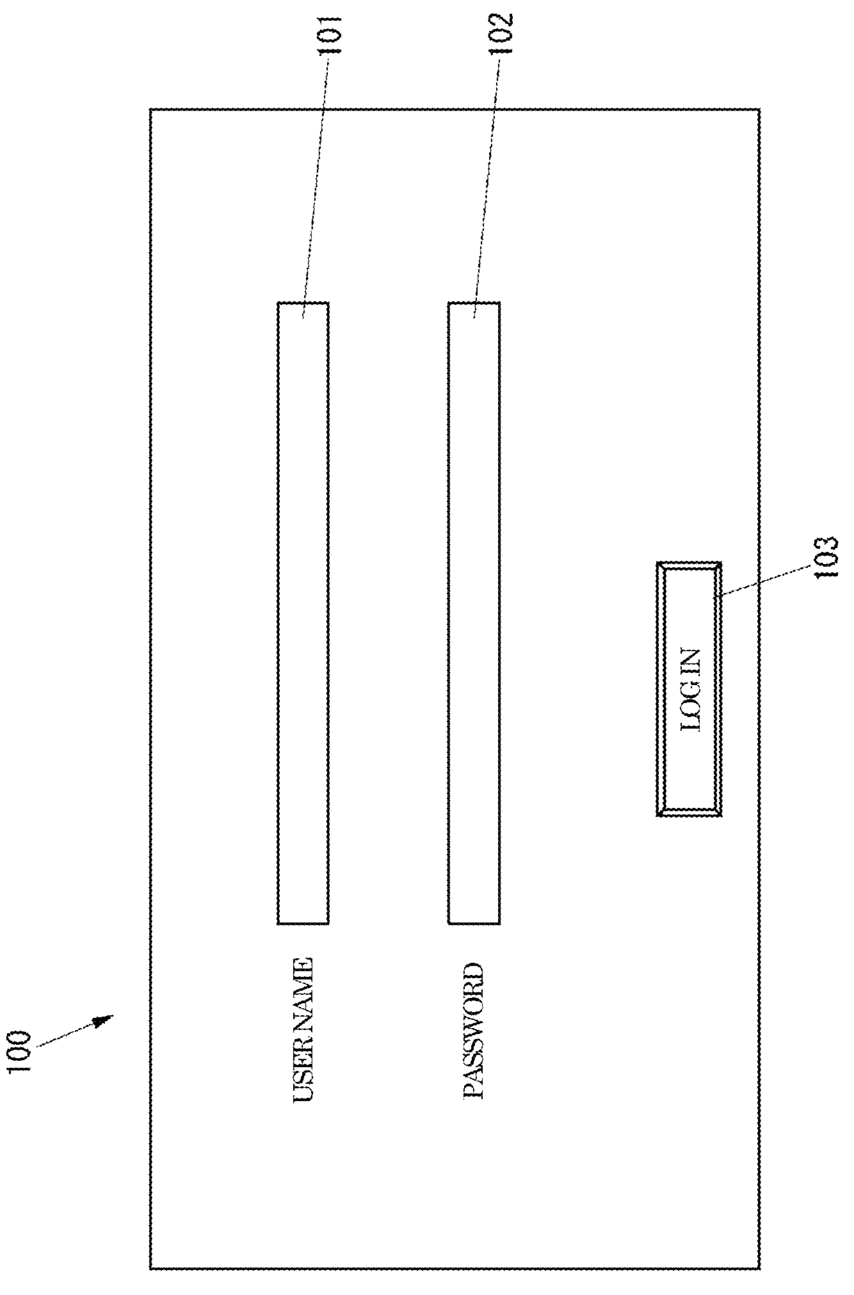
FIG. 9 is a diagram showing an example of a login screen displayed on a display portion of the image forming apparatus shown in FIG. 4.

FIG. 9 is a diagram showing an example of the login screen 100 displayed on the display portion 32 of the image forming apparatus 30.

The login screen 100 shown in FIG. 9 includes a text box 101 for inputting a user name of a user, a text box 102 for inputting a password of the user, and a login button 103 for executing login.

After inputting the user name and the password into the text boxes 101 and 102, respectively, via the operation portion 31, the user can press the login button 103 via the operation portion 31. When the login button 103 is pressed, the cloud storage usage portion 37*a* of the image forming apparatus 30 transmits a request for login (hereinafter, will be referred to as a "login request") to the display information generation system 40 as shown in FIG. 8 (S202). The cloud storage usage portion 37*a* incorporates a combination of the user name input to the text box 101 at a time point the login button 103 is pressed and the password input to the text box 102 at the time point the login button 103 is pressed into the login request.

Upon receiving the login request transmitted by the image forming apparatus 30 in S202, the user authentication portion 45*a* of the display information generation system 40 executes user authentication that uses the combination of the user name and the password included in the received login request (S203). Specifically, the user authentication portion 45*a* determines that the user authentication has succeeded when the combination of the user name and the password included in the login request is included in the user management information 44*b*. On the other hand, the user authentication portion 45*a* determines that the user authentication has failed when the combination of the user name and the password included in the login request is not included in the user management information 44*b*.

Upon determining that the user authentication has failed, the user authentication portion 45*a* of the display information generation system 40 notifies the image forming apparatus 30 of the login failure (S204).

Upon being notified of the login failure from the display information generation system 40 in S204, the cloud storage usage portion 37*a* of the image forming apparatus 30 displays the login failure on the display portion 32 (S205).

Upon determining that the user authentication has succeeded, the user authentication portion 45*a* of the display information generation system 40 notifies the image forming apparatus 30 of the login success (S206).

Upon being notified of the login success from the display information generation system 40 in S206, the cloud storage usage portion 37*a* of the image forming apparatus 30 requests the display information generation system 40 for the list of cloud storage services (S207).

When requested of the list of cloud storage services from the image forming apparatus 30 in S207, the cloud storage list notification portion 45*b* of the display information generation system 40 notifies the image forming apparatus 30 of the list of cloud storage services associated with, in the cloud storage service management information 44*c*, the user who has logged in (hereinafter, will be referred to as a "logged-in user") via the image forming apparatus 30 (S208). Hereinafter, a case where the cloud storage services associated with the logged-in user in the cloud storage service management information 44*c* are the cloud storage services 50, 60, and 70 will be described.

Upon being notified of the login success from the display information generation system 40 in S206, the cloud storage usage portion 37*a* of the image forming apparatus 30 requests the display information generation system 40 of the action button display information (S209).

When requested of the action button display information from the image forming apparatus 30 in S209, the shortcut information acquisition portion 45*c* of the display information generation system 40 requests the cloud storage service 50 out of the cloud storage services associated with the logged-in user in the cloud storage service management information 44*c*, of the shortcut information for the logged-in user (S210).

When requested of the shortcut information for the logged-in user from the display information generation system 40 in S210, the cloud storage service 50 notifies the display information generation system 40 of the shortcut information for the logged-in user (S211).

When requested of the action button display information from the image forming apparatus 30 in S209, the shortcut information acquisition portion 45*c* of the display information generation system 40 requests the cloud storage service 60 out of the cloud storage services associated with the logged-in user in the cloud storage service management information 44*c*, of the shortcut information for the logged-in user (S212).

When requested of the shortcut information for the logged-in user from the display information generation system 40 in S212, the cloud storage service 60 notifies the display information generation system 40 of the shortcut information for the logged-in user (S213).

When requested of the action button display information from the image forming apparatus 30 in S209, the shortcut information acquisition portion 45*c* of the display information generation system 40 requests the cloud storage service 70 out of the cloud storage services associated with the logged-in user in the cloud storage service management information 44*c*, of the shortcut information for the logged-in user (S214).

When requested of the shortcut information for the logged-in user from the display information generation system 40 in S214, the cloud storage service 70 notifies the display information generation system 40 of the shortcut information for the logged-in user (S215).

Upon being notified of the shortcut information from the cloud storage services 50, 60, and 70, the display information generation portion 45*d* of the display information generation system 40 executes display information generation processing as processing for generating action button display information (S216).

Figure 10:
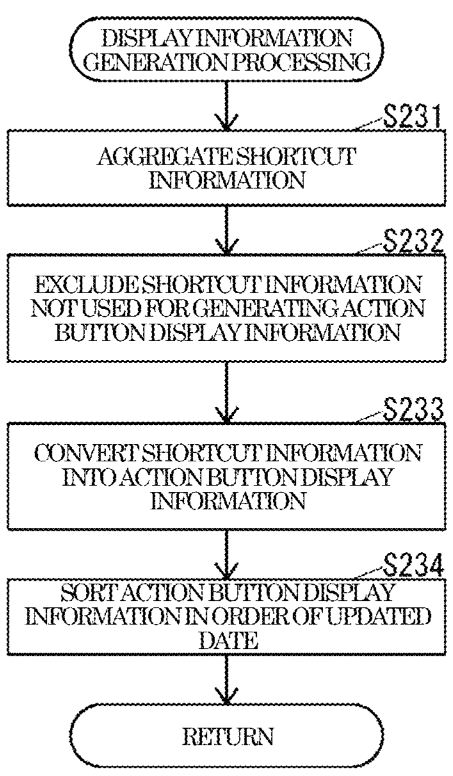
FIG. 10 is a flowchart of display information generation processing shown in FIG. 8.

FIG. 10 is a flowchart of the display information generation processing shown in FIG. 8.

As shown in FIG. 10, the display information generation portion 45*d* of the display information generation system 40 aggregates the shortcut information notified from the cloud storage services 50, 60, and 70 (S231).

FIG. 11 is a diagram showing an example of the shortcut information aggregated by the display information generation system 40.

The shortcut information shown in FIG. 11 is generated by the display information generation portion 45*d* of the display information generation system 40 in S231 when the display information generation system 40 is notified of the shortcut information shown in FIG. 2A by the cloud storage service 50 in S211, the display information generation system 40 is notified of the shortcut information shown in FIG. 2B by the cloud storage service 60 in S213, and the display information generation system 40 is notified of the shortcut information shown in FIG. 2C by the cloud storage service 70 in S215. The shortcut information shown in FIG. 11 shows, for each target of the shortcut function, a notification source of the shortcut information, that is, the cloud storage name of the cloud storage service as the acquisition destination of the shortcut information, the shortcut name, the file type, the identifier, and the updated date.

As shown in FIG. 10, upon ending the processing of S231, the display information generation portion 45*d* of the display information generation system 40 excludes, based on the exclusion rule information associated with the logged-in user out of the exclusion rule information stored in the storage portion 44 and the shortcut information aggregated in S231, shortcut information not used for generating the action button display information from the shortcut information aggregated in S231 (S232).

FIG. 12 is a diagram showing an example of the shortcut information from which the shortcut information not used for generating the action button display information has been excluded by the display information generation system 40.

When the shortcut information shown in FIG. 11 is generated in S231 and the exclusion rule information associated with the logged-in user is the exclusion rule information shown in FIG. 6, the shortcut information shown in FIG. 12 is generated by the display information generation portion 45*d* of the display information generation system 40 in S232. The shortcut information shown in FIG. 12 is obtained by excluding, by the exclusion rule in which the cloud storage name is "Any", the shortcut name is "*.dat", and the file type is "Any" out of the exclusion rule information shown in FIG. 6, shortcut information in which the cloud storage name is "cloud storage service 70", the shortcut name is "G.dat", and the file type is "file" from the shortcut information shown in FIG. 11. The shortcut information shown in FIG. 12 is obtained by excluding, by the exclusion rule in which the cloud storage name is "cloud storage service 50", the shortcut name is "folder B", and the file type is "folder" out of the exclusion rule information shown in FIG. 6, shortcut information in which the cloud storage name is "cloud storage service 50", the shortcut name is "folder B", and the file type is "folder" from the shortcut information shown in FIG. 11. The shortcut information shown in FIG. 12 is obtained by excluding, by the exclusion rule in which the cloud storage name is "cloud storage service 60", the shortcut name is "Any", and the file type is "folder" out of the exclusion rule information shown in FIG. 6, shortcut information in which the cloud storage name is "cloud storage service 60", the shortcut name is "D", and the file type is "folder" from the shortcut information shown in FIG. 11.

As shown in FIG. 10, upon ending the processing of S232, the display information generation portion 45*d* of the display information generation system 40 converts, based on the conversion rule information associated with the logged-in user out of the conversion rule information stored in the storage portion 44 and the shortcut information aggregated in S231, the shortcut information that has remained without being excluded in S232 out of the shortcut information aggregated in S231 into the action button display information (S233).

FIG. 13 is a diagram showing an example of the action button display information obtained by converting the shortcut information by the display information generation system 40.

When the shortcut information that has remained without being excluded in S232 out of the shortcut information aggregated in S231 is the shortcut information shown in FIG. 12 and the conversion rule information associated with the logged-in user is the conversion rule information shown in FIG. 7, the action button display information shown in FIG. 13 is generated by the display information generation portion 45*d* of the display information generation system 40 in S233.

As shown in FIG. 10, upon ending the processing of S233, the display information generation portion 45*d* of the display information generation system 40 sorts the action button display information generated in S233 in the order of the updated dates (S234) and ends the display information generation processing shown in FIG. 10.

When the action button display information obtained by the conversion in S233 is the action button display information shown in FIG. 13, the action button display information shown in FIG. 3 is generated by the display information generation portion 45*d* of the display information generation system 40 in S234.

As shown in FIG. 8, upon ending execution of the display information generation processing in S216, the display information notification portion 45*e* of the display information generation system 40 notifies the image forming apparatus 30 of the action button display information generated by the display information generation processing in S216 (S217).

When the action button display information is transmitted from the display information generation system 40 in S217, the cloud storage usage portion 37*a* of the image forming apparatus 30 displays a home screen 110 (see FIG. 14) on the display portion 32 based on the list of cloud storage services notified from the display information generation system 40 in S208 and the action button display information notified from the display information generation system 40 in S217 (S218).

Figure 14:
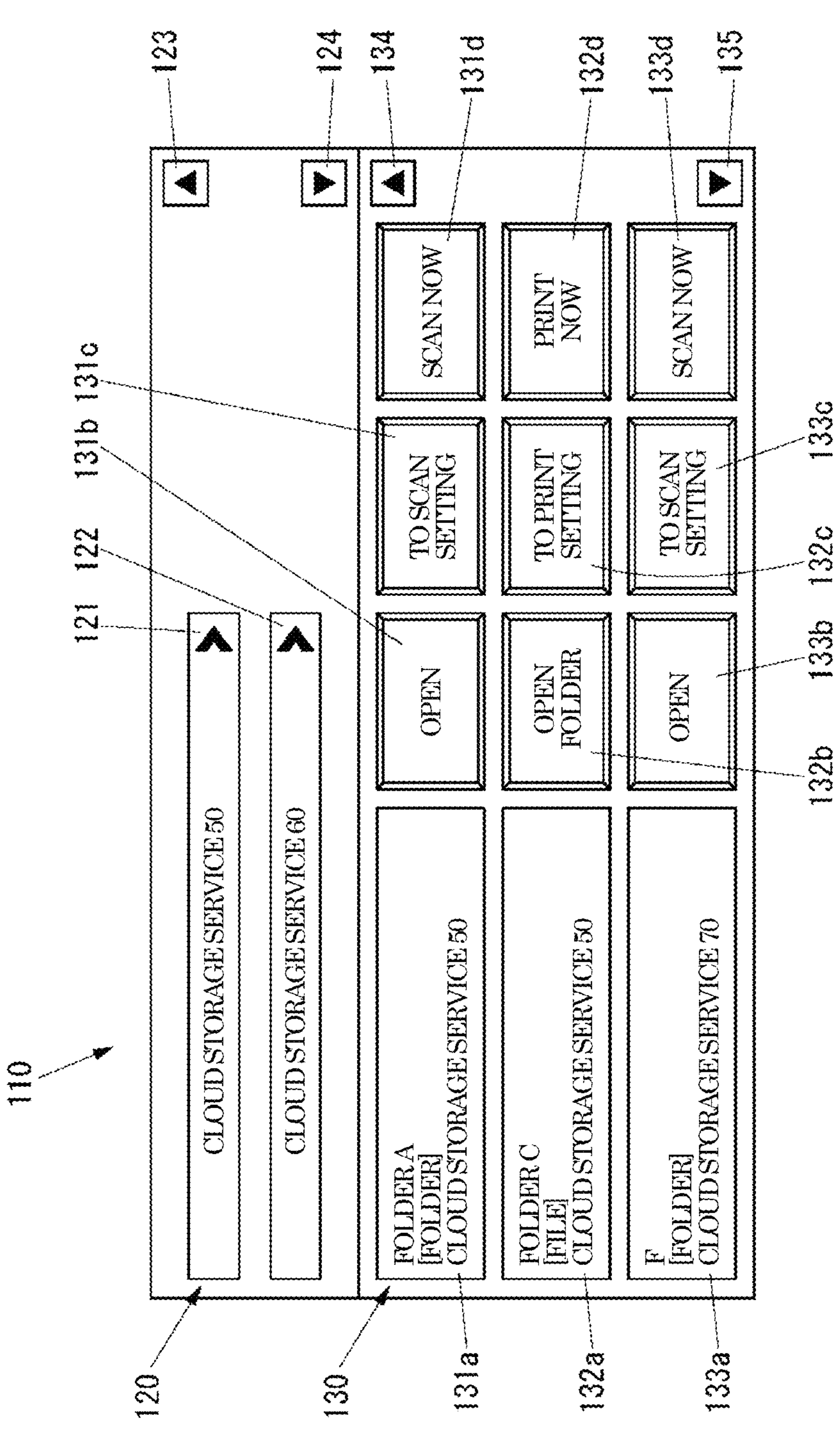
FIG. 14 is a diagram showing an example of the home screen displayed on the display portion of the image forming apparatus shown in FIG. 4.

FIG. 14 is a diagram showing an example of the home screen 110 displayed on the display portion 32 of the image forming apparatus 30.

The home screen 110 shown in FIG. 14 includes a cloud storage service list display area 120 for displaying the list of cloud storage services and an action button display area 130 for displaying the action buttons.

The cloud storage service list display area 120 includes, for each of the cloud storage services, a button for accessing the cloud storage service notified from the display information generation system 40 in S208. For example, displayed in the cloud storage service list display area 120 shown in FIG. 14 are a button 121 for accessing the first cloud storage service 50 out of the list of cloud storage services notified from the display information generation system 40 in S208 and a button 122 for accessing the second cloud storage service 60 out of the list of cloud storage services notified from the display information generation system 40 in S208. The cloud storage service list display area 120 includes a button 123 for displaying, in the cloud storage service list display area 120, the cloud storage service before the cloud storage service currently displayed in the cloud storage service list display area 120 out of the list of cloud storage services notified from the display information generation system 40 in S208 and a button 124 for displaying, in the cloud storage service list display area 120, the cloud storage service after the cloud storage service currently displayed in the cloud storage service list display area 120 out of the list of cloud storage services notified from the display information generation system 40 in S208. By pressing the button 124, a button for accessing the third cloud storage service 70 out of the list of cloud storage services notified from the display information generation system 40 in S208 is displayed in the cloud storage service list display area 120 shown in FIG. 14.

The action button display area 130 includes, for each target of the shortcut function, a target display area for displaying a target of the shortcut function by the cloud storage name and the shortcut name and at least one button as the action button. A file type of the target of the shortcut function is also displayed in the target display area.

For example, displayed in the action button display area 130 shown in FIG. 14 are a target display area 131*a* for displaying the cloud storage name "cloud storage service 50" and the shortcut name "folder A" of the first target of the shortcut function out of the action button display information notified from the display information generation system 40 in S217, an "open" button 131*b* for causing the image forming apparatus to execute the "file list display operation" as an action with respect to the first target of the shortcut function out of the action button display information notified from the display information generation system 40 in S217, a "to scan setting" button 131*c* for causing the image forming apparatus to execute the "scan setting screen display operation" as an action with respect to the first target of the shortcut function out of the action button display information notified from the display information generation system 40 in S217, and a "scan now" button 131*d* for causing the image forming apparatus to execute the "immediate scan operation" as an action with respect to the first target of the shortcut function out of the action button display information notified from the display information generation system 40 in S217.

Further displayed in the action button display area 130 shown in FIG. 14 are a target display area 132*a* for displaying the cloud storage name "cloud storage service 50" and the shortcut name "file C" of the second target of the shortcut function out of the action button display information notified from the display information generation system 40 in S217, an "open folder" button 132*b* for causing the image forming apparatus to execute the "same-folder file list display operation" as an action with respect to the second target of the shortcut function out of the action button display information notified from the display information generation system 40 in S217, a "to print setting" button 132*c* for causing the image forming apparatus to execute the "print setting screen display operation" as an action with respect to the second target of the shortcut function out of the action button display information notified from the display information generation system 40 in S217, and a "print now" button 132*d* for causing the image forming apparatus to execute the "immediate print operation" as an action with respect to the second target of the shortcut function out of the action button display information notified from the display information generation system 40 in S217.

Further displayed in the action button display area 130 shown in FIG. 14 are a target display area 133*a* for displaying the cloud storage name "cloud storage service 70" and the shortcut name "F" of the third target of the shortcut function out of the action button display information notified from the display information generation system 40 in S217, an "open" button 133*b* for causing the image forming apparatus to execute the "file list display operation" as an action with respect to the third target of the shortcut function out of the action button display information notified from the display information generation system 40 in S217, a "to scan setting" button 133*c* for causing the image forming apparatus to execute the "scan setting screen display operation" as an action with respect to the third target of the shortcut function out of the action button display information notified from the display information generation system 40 in S217, and a "scan now" button 133*d* for causing the image forming apparatus to execute the "immediate scan operation" as an action with respect to the third target of the shortcut function out of the action button display information notified from the display information generation system 40 in S217.

The action button display area 130 shown in FIG. 14 includes a button 134 for displaying, in the action button display area 130, the action button of the target of the shortcut function before the target of the shortcut function for which the action button is currently displayed in the action button display area 130 out of the action button display information notified from the display information generation system 40 in S217 and a button 135 for displaying, in the action button display area 130, the action button of the target of the shortcut function after the target of the shortcut function for which the action button is currently displayed in the action button display area 130 out of the action button display information notified from the display information generation system 40 in S217. By pressing the button 135, a target display area for displaying a cloud storage name "cloud storage service 60" and a shortcut name "E.txt" of a fourth target of the shortcut function out of the action button display information notified from the display information generation system 40 in S217, an "open folder" button for causing the image forming apparatus to execute the "same-folder file list display operation" as an action with respect to the fourth target of the shortcut function out of the action button display information notified from the display information generation system 40 in S217, a "to scan setting" button for causing the image forming apparatus to execute the "scan setting screen display operation" as an action with respect to the fourth target of the shortcut function out of the action button display information notified from the display information generation system 40 in S217, and a "scan now" button for causing the image forming apparatus to execute the "immediate scan operation" as an action with respect to the fourth target of the shortcut function out of the action button display information notified from the display information generation system 40 in S217 are displayed in the action button display area 130 shown in FIG. 14.

Next, operations of the system 10 in a case where a button for accessing the cloud storage service is pressed in the home screen 110 will be described.

Figure 15:
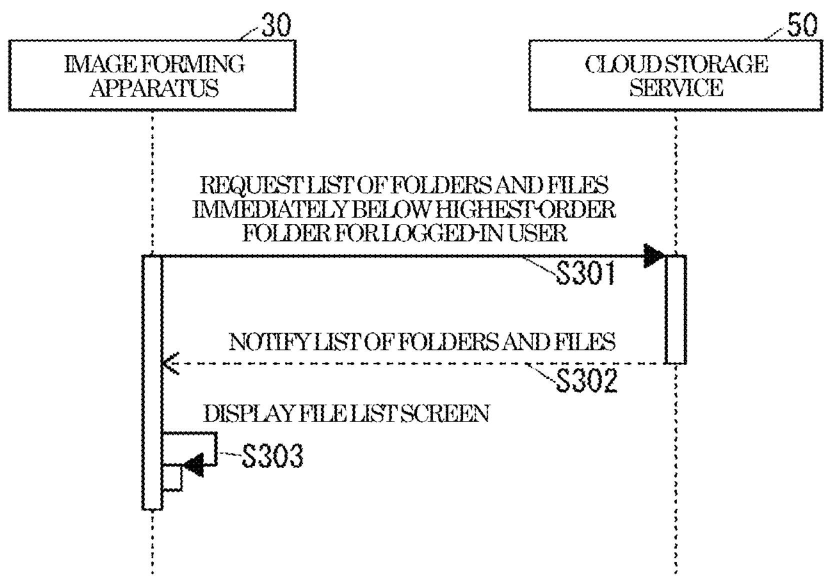
FIG. 15 is an operation sequence diagram of the system shown in FIG. 1 in a case where a button for accessing the cloud storage service is pressed in the home screen.

FIG. 15 is an operation sequence diagram of the system 10 in the case where a button for accessing the cloud storage service is pressed in the home screen 110.

In descriptions below, a case where the button 121 is pressed in the home screen 110 as the button for accessing the cloud storage service will be described as an example.

When the button 121 is pressed in the home screen 110, the cloud storage usage portion 37*a* of the image forming apparatus 30 requests the cloud storage service 50 associated with the button 121 for a list of folders and files immediately below a highest-order folder for the logged-in user as shown in FIG. 15 (S301).

Upon receiving the request in S301, the cloud storage service 50 notifies the image forming apparatus 30 of the list requested in S301 (S302).

Upon being notified in S302, the cloud storage usage portion 37*a* of the image forming apparatus 30 displays a file list screen 140 (see FIG. 16) that shows the list notified in S302 on the display portion 32 (S303).

Figure 16:
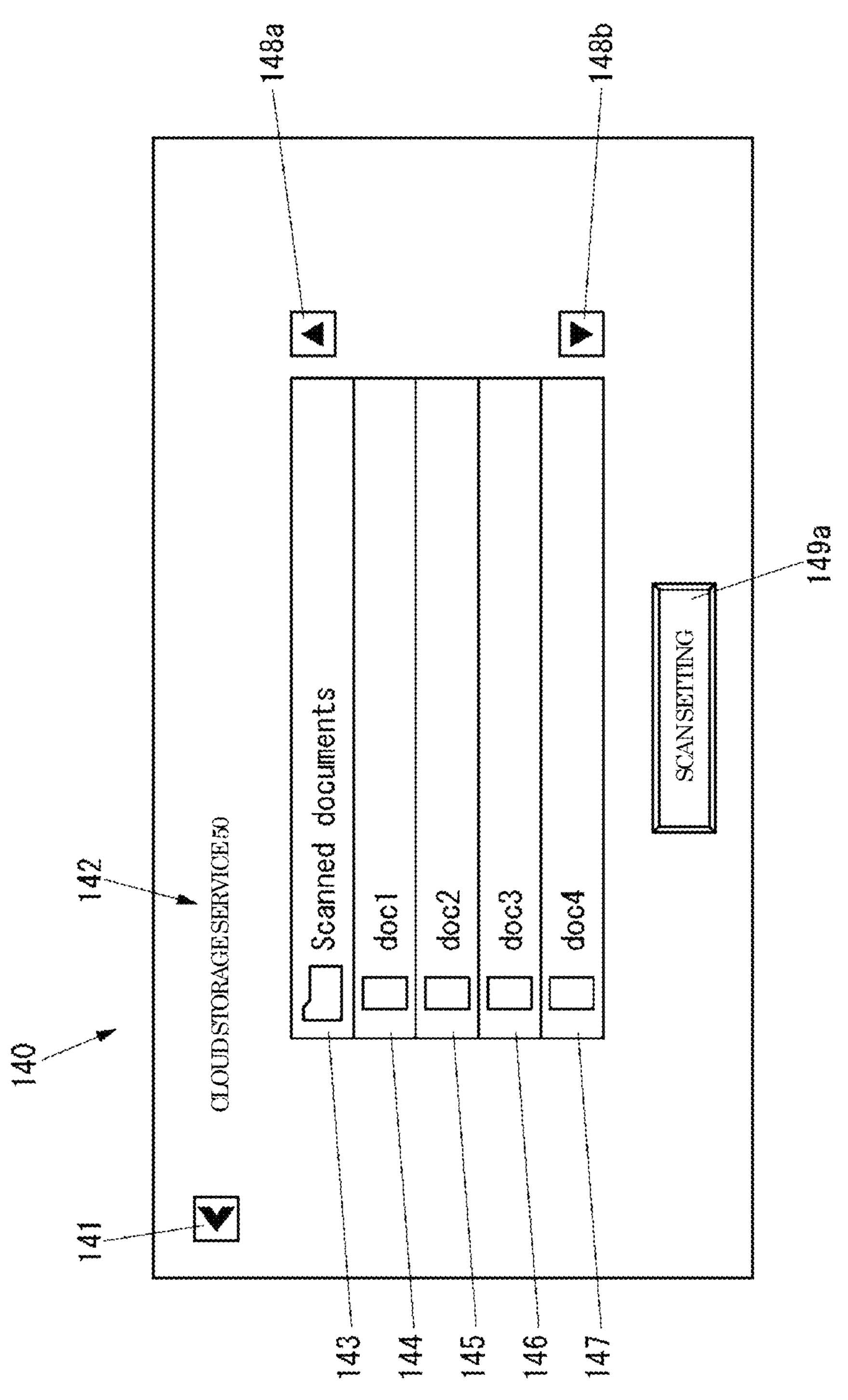
FIG. 16 is a diagram showing an example of a file list screen displayed on the display portion of the image forming apparatus shown in FIG. 4 when accessing a highest-order folder.

FIG. 16 is a diagram showing an example of the file list screen 140 displayed on the display portion 32 of the image forming apparatus 30 when accessing a highest-order folder.

The file list screen 140 shown in FIG. 16 includes a button 141 for shifting to the home screen 110 (see FIG. 14), a text 142 indicating the currently-accessed cloud storage service 50, an item 143 indicating a folder immediately below the currently-accessed folder, and items 144 to 147 indicating files immediately below the currently-accessed folder. The number of items indicating the folders immediately below the currently-accessed folder is one in the example shown in FIG. 16, but the number is not limited to one, and may be zero or two or more and depends on the number of folders immediately below the currently-accessed folder. The number of items indicating the files immediately below the currently-accessed folder is four in the example shown in FIG. 16, but the number is not limited to four, and may be zero, one or more and three or less, or five or more and depends on the number of files immediately below the currently-accessed folder. The file list screen 140 includes a button 148*a* for displaying, in the file list screen 140, an item indicating a folder or a file before the folder and the files for which the items are currently displayed in the file list screen 140 out of the list of folders and files notified in S302 and a button 148*b* for displaying, in the file list screen 140, an item indicating a folder or a file after the folder and the files for which the items are currently displayed in the file list screen 140 out of the list of folders and files notified in S302. The file list screen 140 includes a "scan setting" button 149*a* for displaying the scan setting screen.

Figure 17:
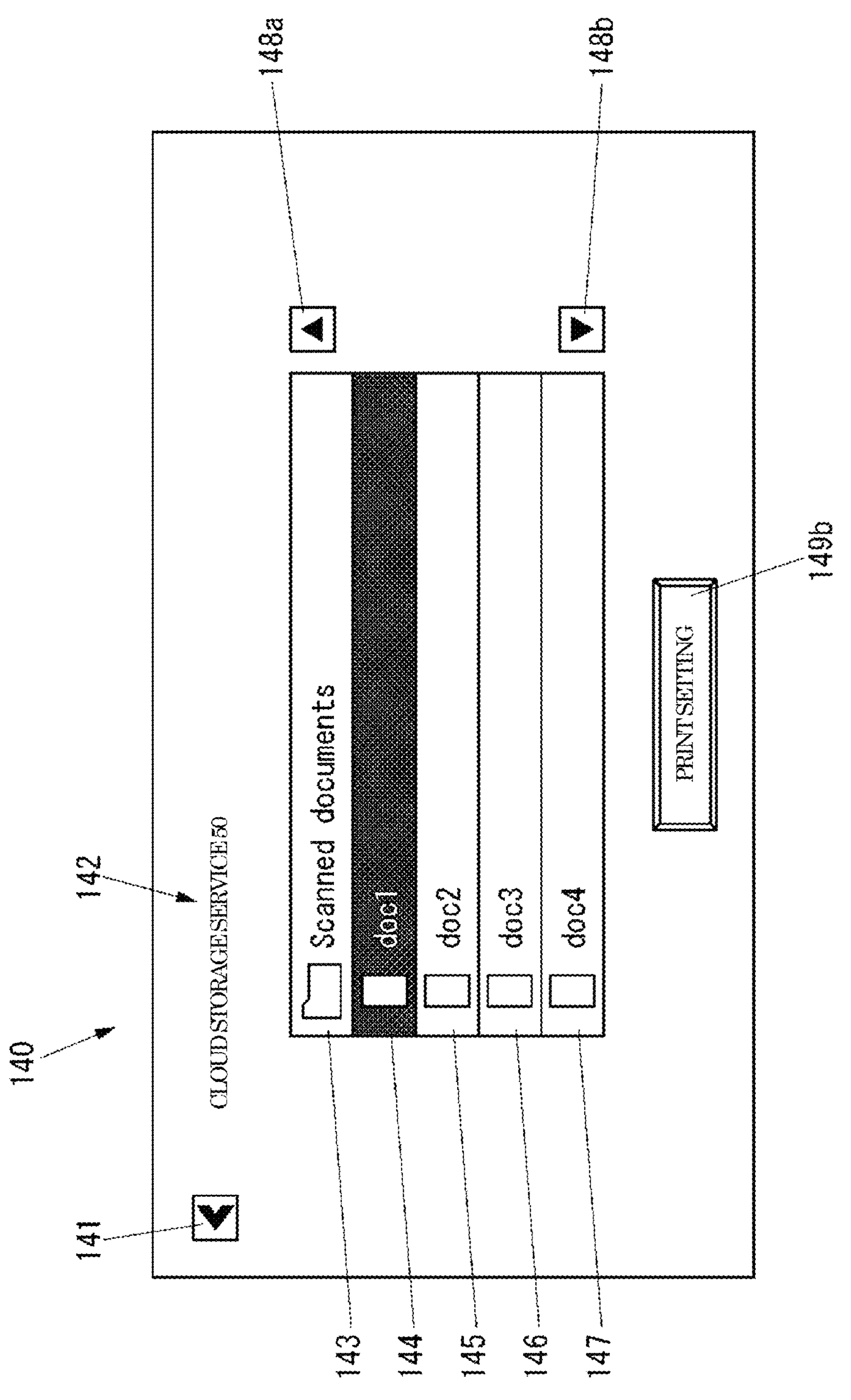
FIG. 17 is a diagram showing an example of the file list screen shown in FIG. 16 in a case where an item indicating a file is selected.

FIG. 17 is a diagram showing an example of the file list screen 140 in a case where an item indicating a file is selected.

When the item indicating a file is selected in the file list screen 140, the "scan setting" button 149*a* (see FIG. 16) becomes a "print setting" button 149*b* for displaying the print setting screen as shown in FIG. 17. In the example shown in FIG. 17, the item 144 is selected as the item indicating a file.

Next, operations of the system 10 in a case where the item indicating a folder is selected in the file list screen 140 will be described.

Figure 18:
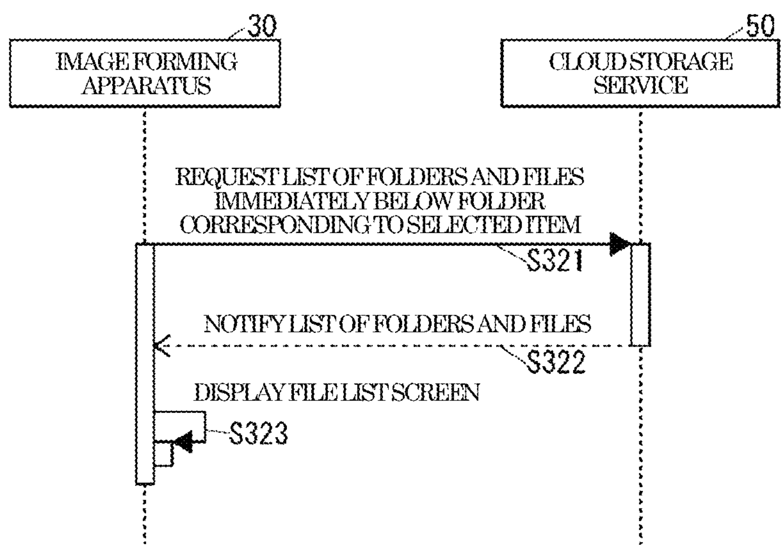
FIG. 18 is an operation sequence diagram of the system shown in FIG. 1 in a case where an item indicating a folder is selected in the file list screen.

FIG. 18 is an operation sequence diagram of the system 10 in the case where the item indicating a folder is selected in the file list screen 140.

In descriptions below, a case where the item 143 is selected in the file list screen 140 will be described as an example.

When the item 143 is selected in the file list screen 140, the cloud storage usage portion 37*a* of the image forming apparatus 30 requests the currently-accessed cloud storage service 50 for a list of folders and files immediately below a folder corresponding to the selected item 143 as shown in FIG. 18 (S321).

Upon receiving the request in S321, the cloud storage service 50 notifies the image forming apparatus 30 of the list requested in S321 (S322).

Upon being notified in S322, the cloud storage usage portion 37*a* of the image forming apparatus 30 displays a file list screen 150 (see FIG. 19) that shows the list notified in S322 on the display portion 32 (S323).

Figure 19:
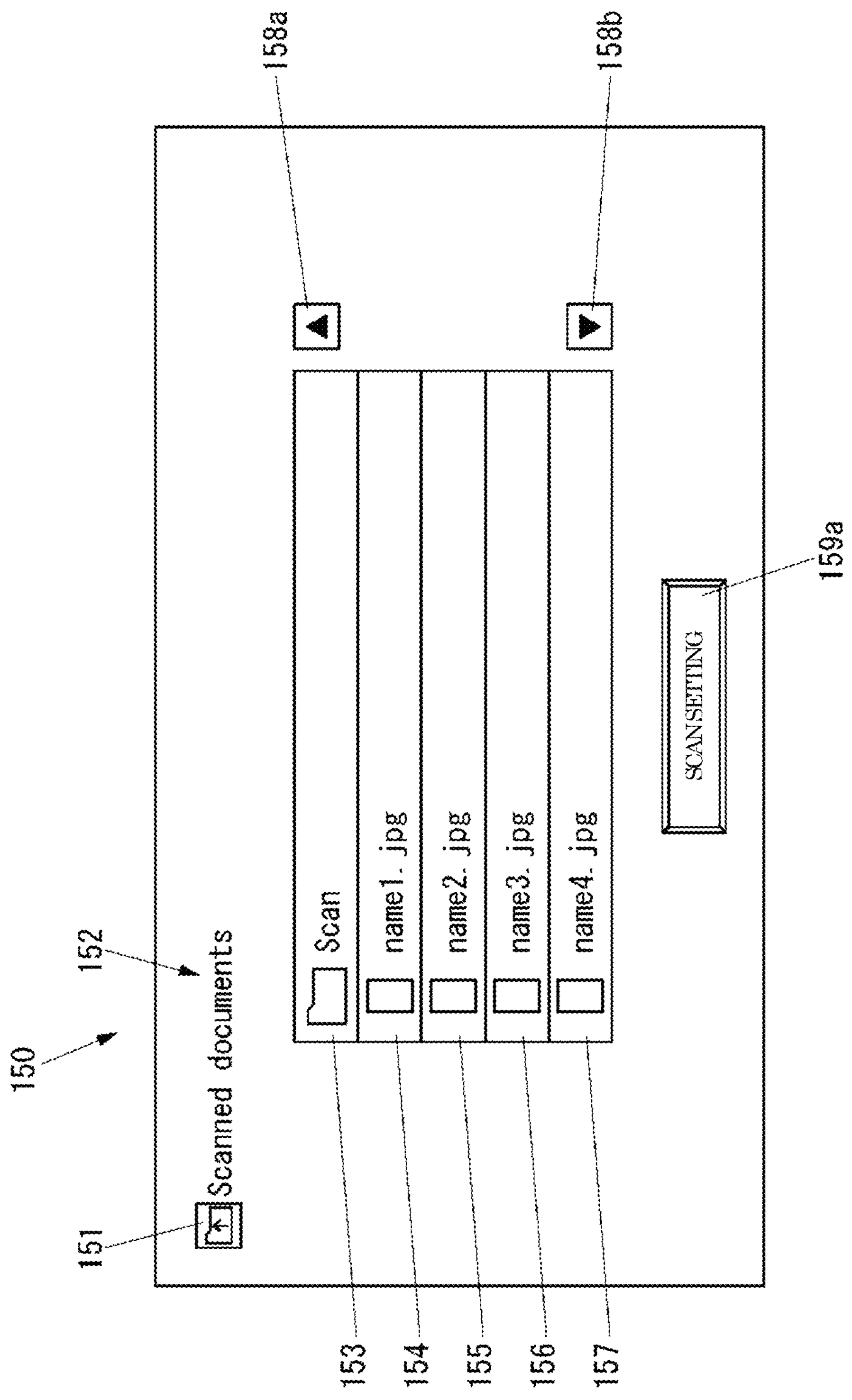
FIG. 19 is a diagram showing an example of the file list screen displayed on the display portion of the image forming apparatus shown in FIG. 4 when accessing a folder other than the highest-order folder.

FIG. 19 is a diagram showing an example of the file list screen 150 displayed on the display portion 32 of the image forming apparatus 30 when accessing a folder other than the highest-order folder.

The file list screen 150 shown in FIG. 19 includes a button 151 for shifting to the file list screen 140 (see FIG. 16) that shows the list of folders and files immediately below a folder that is one order higher than the currently-accessed folder, a text 152 indicating the currently-accessed folder, an item 153 indicating a folder immediately below the currently-accessed folder, and items 154 to 157 indicating files immediately below the currently-accessed folder. The number of items indicating the folders immediately below the currently-accessed folder is one in the example shown in FIG. 19, but the number is not limited to one, and may be zero or two or more and depends on the number of folders immediately below the currently-accessed folder. The number of items indicating the files immediately below the currently-accessed folder is four in the example shown in FIG. 19, but the number is not limited to four, and may be zero, one or more and three or less, or five or more and depends on the number of files immediately below the currently-accessed folder. The file list screen 150 includes a button 158*a* for displaying, in the file list screen 150, an item indicating a folder or a file before the folder and the files for which the items are currently displayed in the file list screen 150 out of the list of folders and files notified in S322 and a button 158*b* for displaying, in the file list screen 150, an item indicating a folder or a file after the folder and the files for which the items are currently displayed in the file list screen 150 out of the list of folders and files notified in S322. The file list screen 150 includes a "scan setting" button 159*a* for displaying the scan setting screen.

Similar to the file list screen 140 (see FIG. 16), when the item indicating a file is selected in the file list screen 150, the "scan setting" button 159*a* becomes the "print setting" button for displaying the print setting screen.

When there are one or more folders immediately below the currently-accessed folder, the cloud storage usage portion 37*a* of the image forming apparatus 30 can display, on the display portion 32, the file list screen that shows the list of folders and files immediately below the folder immediately below the currently-accessed folder by operations similar to the operations described above.

Next, operations of the system 10 in a case where the "scan setting" button is pressed in the file list screen will be described.

Figure 20:
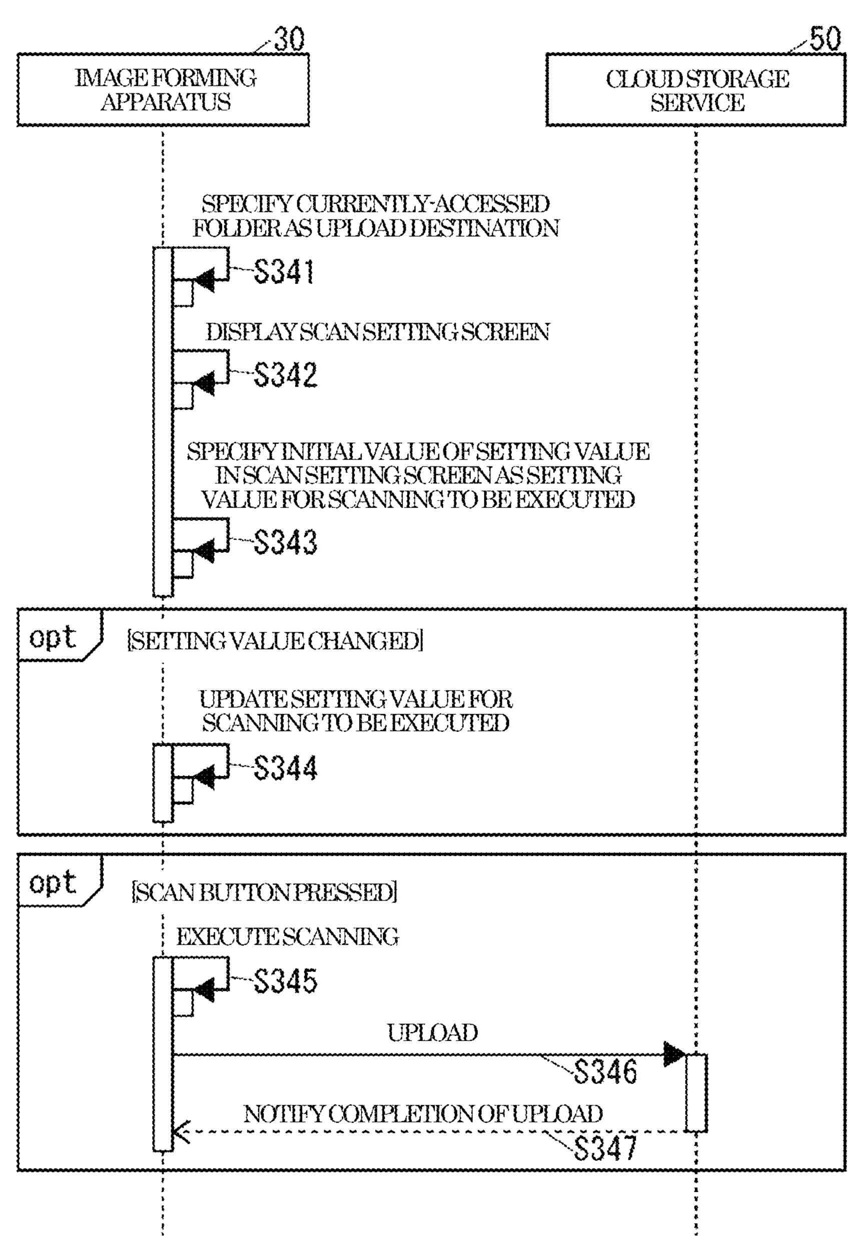
FIG. 20 is an operation sequence diagram of the system shown in FIG. 1 in a case where a "scan setting" button is pressed in the file list screen.

FIG. 20 is an operation sequence diagram of the system 10 in the case where the "scan setting" button is pressed in the file list screen.

In descriptions below, a case where the "scan setting" button 149*a* (see FIG. 16) is pressed in the file list screen 140 (see FIG. 16) will be described as an example.

When the "scan setting" button 149*a* is pressed in the file list screen 140, the cloud storage usage portion 37*a* of the image forming apparatus 30 specifies the currently-accessed folder as an upload destination as shown in FIG. 20 (S341).

Next, the cloud storage usage portion 37*a* displays a scan setting screen 160 (see FIG. 21) on the display portion 32 (S342).

Figure 21:
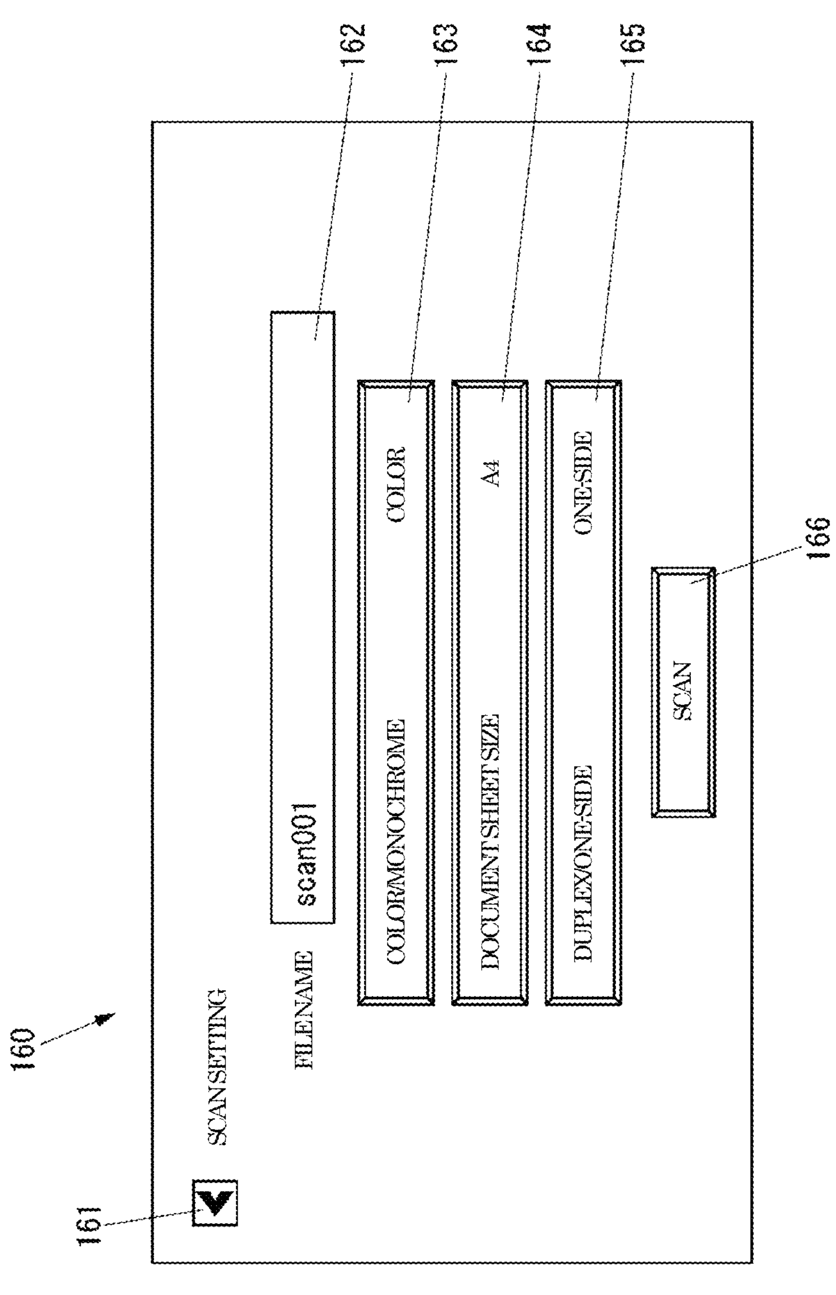
FIG. 21 is a diagram showing an example of a scan setting screen displayed on the display portion of the image forming apparatus shown in FIG. 4.

FIG. 21 is a diagram showing an example of the scan setting screen 160 displayed on the display portion 32 of the image forming apparatus 30.

The scan setting screen 160 shown in FIG. 21 includes a button 161 for shifting to the file list screen 140 (see FIG. 16) that shows the list of folders and files immediately below the currently-accessed folder, a text box 162 for designating a file name of a file generated by scanning, a button 163 for designating a setting value with respect to "color/monochrome" that is the setting item for scanning, a button 164 for designating a setting value with respect to "document sheet size" that is the setting item for scanning, a button 165 for designating a setting value with respect to "duplex/one-side" that is the setting item for scanning, and a "scan" button 166 for executing scanning. In the scan setting screen 160 shown in FIG. 21, the button 163 indicates that "color" is designated as the setting value with respect to "color/monochrome", the button 164 indicates that "A4" is designated as the setting value with respect to "document sheet size", and the button 165 indicates that "one-side" is designated as the setting value with respect to "duplex/one-side".

As shown in FIG. 20, upon ending the processing of S342, the cloud storage usage portion 37*a* of the image forming apparatus 30 specifies initial values of the setting values in the scan setting screen 160 as the setting values for scanning to be executed (S343).

Upon ending the processing of S343, the cloud storage usage portion 37*a* updates the specified setting value for scanning to be executed every time the setting value is changed by any of the text box 162 and the buttons 163 to 165 in the scan setting screen 160 (S344).

When the "scan" button 166 is pressed after the processing of S343 is ended, the cloud storage usage portion 37*a* executes scanning by the scanner 34 using the specified setting values for scanning to be executed (S345).

Upon ending the processing of S345, the cloud storage usage portion 37*a* uploads a file generated by the scanning to the folder that is the upload destination specified in S341 in the currently-accessed cloud storage service 50 (S346). It is noted that when a file having the same file name as the file name designated in the scan setting screen 160 already exists in the upload destination, the cloud storage service 50 may automatically set the file name of the file uploaded in S346 so as not to overlap with the file name of the file already existing in the upload destination.

Upon completing the upload in S346, the cloud storage service 50 notifies the image forming apparatus 30 of the completion of the upload (S347).

Next, operations of the system 10 in a case where the "print setting" button is pressed in the file list screen will be described.

Figure 22:
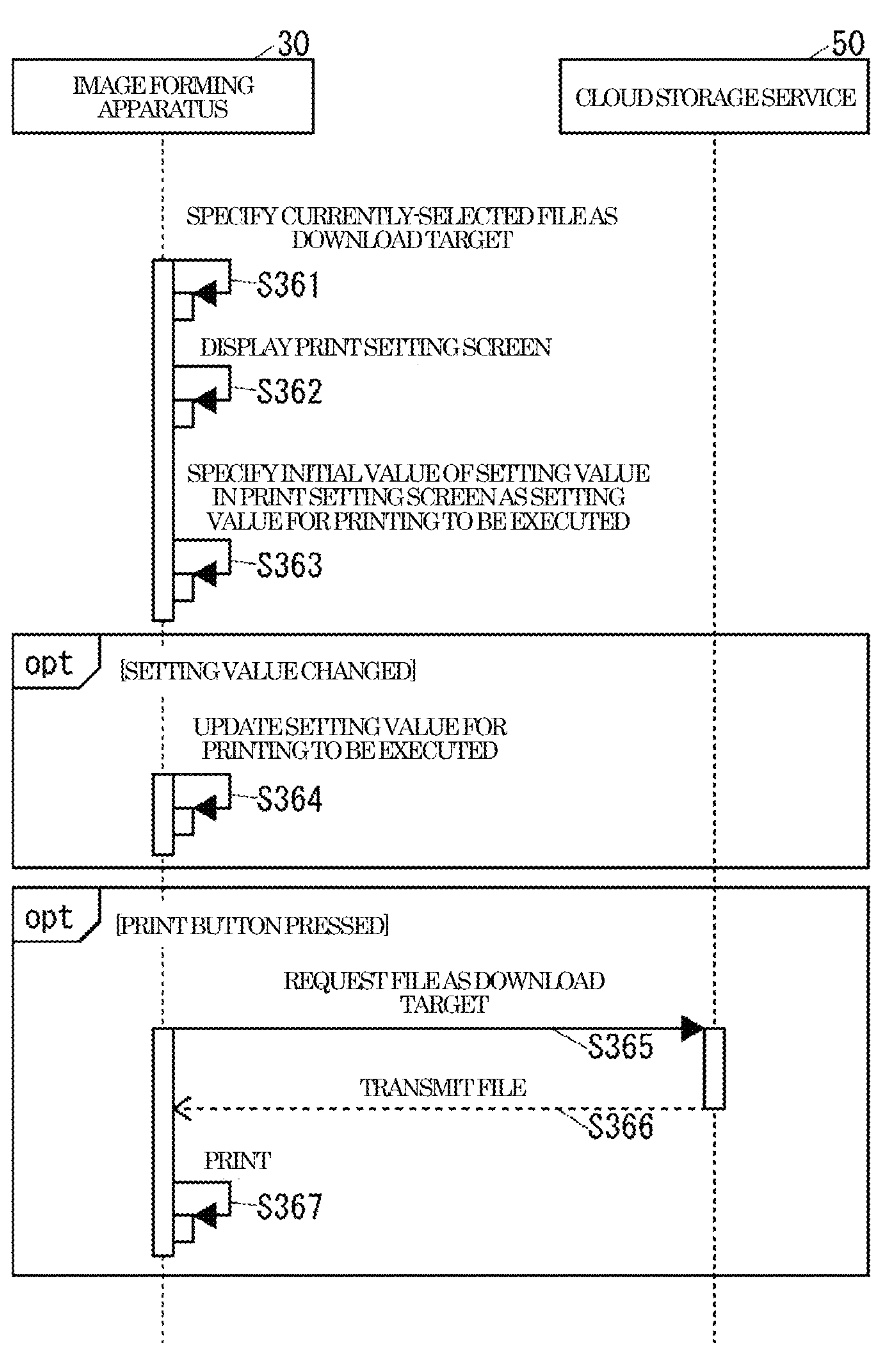
FIG. 22 is an operation sequence diagram of the system shown in FIG. 1 in a case where a "print setting" button is pressed in the file list screen.

FIG. 22 is an operation sequence diagram of the system 10 in the case where the "print setting" button is pressed in the file list screen.

In descriptions below, a case where the "print setting" button 149*b* (see FIG. 17) is pressed in the file list screen 140 (see FIG. 17) will be described as an example.

When the "print setting" button 149*b* is pressed in the file list screen 140, the cloud storage usage portion 37*a* of the image forming apparatus 30 specifies the currently-selected file as a download target as shown in FIG. 22 (S361).

Next, the cloud storage usage portion 37*a* displays a print setting screen 170 (see FIG. 23) on the display portion 32 (S362).

Figure 23:
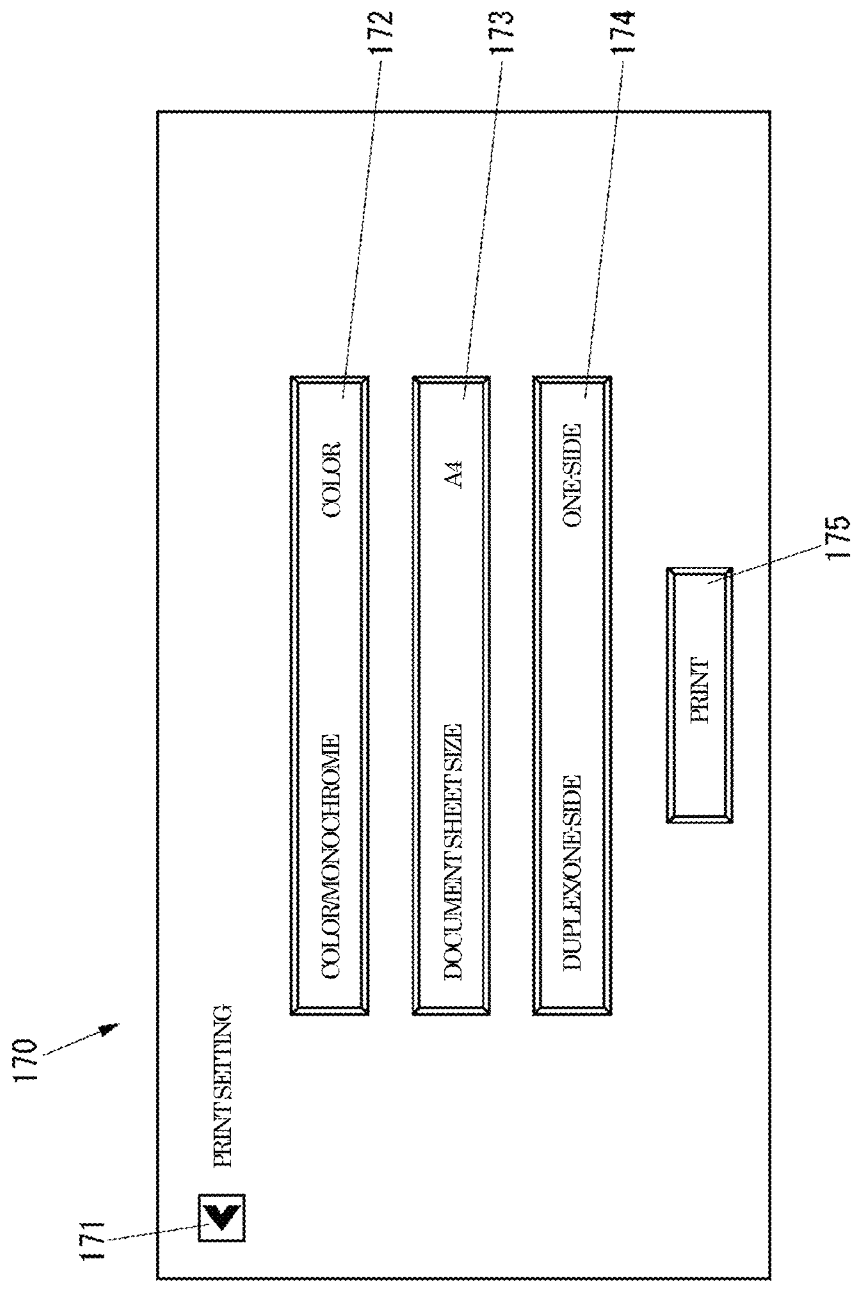
FIG. 23 is a diagram showing an example of a print setting screen displayed on the display portion of the image forming apparatus shown in FIG. 4.

FIG. 23 is a diagram showing an example of the print setting screen 170 displayed on the display portion 32 of the image forming apparatus 30.

The print setting screen 170 shown in FIG. 23 includes a button 171 for shifting to the file list screen 140 (see FIG. 16) that shows a list of folders and files immediately below the currently-accessed folder, a button 172 for designating a setting value with respect to "color/monochrome" that is the setting item for printing, a button 173 for designating a setting value with respect to "paper sheet size" that is the setting item for printing, a button 174 for designating a setting value with respect to "duplex/one-side" that is the setting item for printing, and a "print" button 175 for executing printing. In the print setting screen 170 shown in FIG. 23, the button 172 indicates that "color" is designated as the setting value with respect to "color/monochrome", the button 173 indicates that "A4" is designated as the setting value with respect to "paper sheet size", and the button 174 indicates that "one-side" is designated as the setting value with respect to "duplex/one-side".

As shown in FIG. 22, upon ending the processing of S362, the cloud storage usage portion 37*a* of the image forming apparatus 30 specifies initial values of the setting values in the print setting screen 170 as the setting values for printing to be executed (S363).

Upon ending the processing of S363, the cloud storage usage portion 37*a* updates the specified setting value for printing to be executed every time the setting value is changed by any of the buttons 172 to 174 in the print setting screen 170 (S364).

When the "print" button 175 is pressed after the processing of S363 is ended, the cloud storage usage portion 37*a* requests the currently-accessed cloud storage service 50 for the file that is the download target specified in S361 (S365).

Upon receiving the request in S365, the cloud storage service 50 transmits the file requested in S365 to the image forming apparatus 30 (S366).

Upon receiving the file transmitted from the cloud storage service 50 in S366, the cloud storage usage portion 37*a* prints the received file by the printer 33 using the specified setting values for printing to be executed (S367).

Next, operations of the system 10 in a case where the "open" button is pressed in the home screen 110 (see FIG. 14) will be described.

Figure 24:
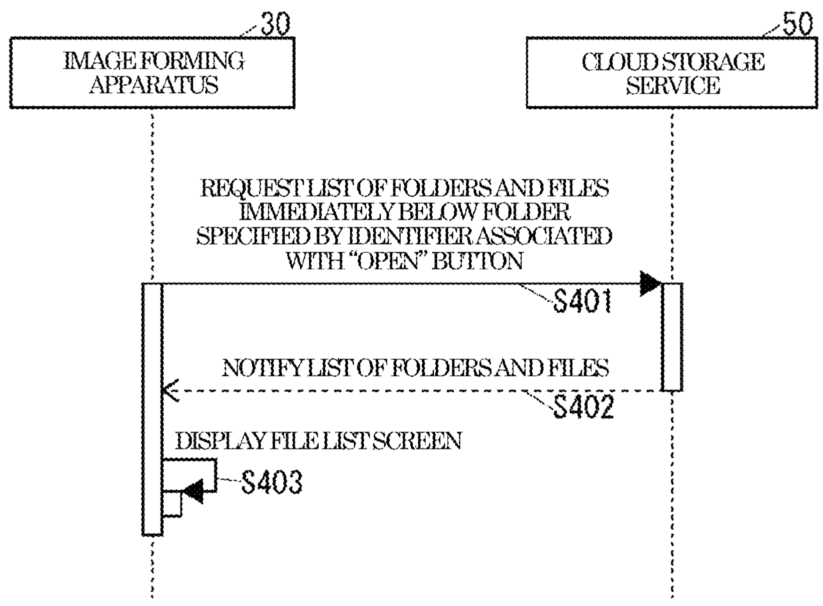
FIG. 24 is an operation sequence diagram of the system shown in FIG. 1 in a case where an "open" button is pressed in the home screen.

FIG. 24 is an operation sequence diagram of the system 10 in the case where the "open" button is pressed in the home screen 110.

In descriptions below, a case where the "open" button 131*b* (see FIG. 14) is pressed in the home screen 110 will be described as an example.

When the "open" button 131*b* is pressed in the home screen 110, the cloud storage usage portion 37*a* of the image forming apparatus 30 requests the cloud storage service 50 associated with the "open" button 131*b* in the action button display information notified from the display information generation system 40 in S217 (see FIG. 8) for a list of folders and files immediately below a folder specified by an identifier associated with the "open" button 131*b* in the action button display information notified from the display information generation system 40 in S217 as shown in FIG. 24 (S401).

Upon receiving the request in S401, the cloud storage service 50 notifies the image forming apparatus 30 of the list requested in S401 (S402).

Upon receiving the notification in S402, the cloud storage usage portion 37*a* of the image forming apparatus 30 displays a file list screen that shows the list notified in S402 on the display portion 32 (S403). The file list screen displayed in S403 is, for example, a file list screen similar to the file list screen 140 shown in FIG. 16 or the file list screen 150 shown in FIG. 19.

Next, operations of the system 10 in a case where the "to scan setting" button is pressed in the home screen 110 (see FIG. 14) will be described.

Figure 25:
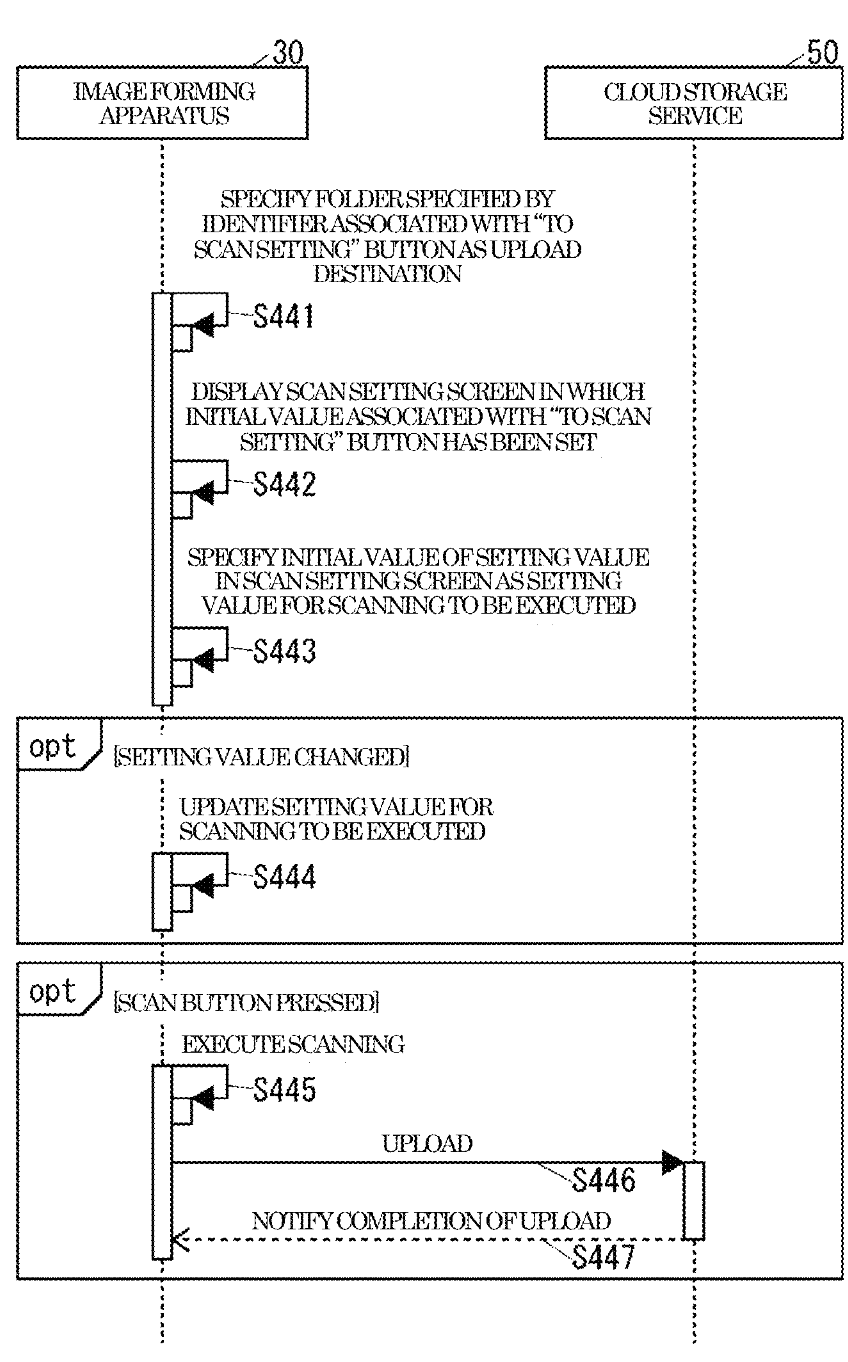
FIG. 25 is an operation sequence diagram of the system shown in FIG. 1 in a case where a "to scan setting" button is pressed in the home screen.

FIG. 25 is an operation sequence diagram of the system 10 in the case where the "to scan setting" button is pressed in the home screen 110.

In descriptions below, a case where the "to scan setting" button 131*c* (see FIG. 14) is pressed in the home screen 110 will be described as an example.

When the "to scan setting" button 131*c* is pressed in the home screen 110, the cloud storage usage portion 37*a* of the image forming apparatus 30 specifies, as the upload destination, a folder specified by an identifier associated with the "to scan setting" button 131*c* in the action button display information notified from the display information generation system 40 in S217 (see FIG. 8) as shown in FIG. 25 (S441).

Next, the cloud storage usage portion 37*a* displays, on the display portion 32, a scan setting screen set with the initial values associated with the "to scan setting" button 131*c* in the action button display information notified from the display information generation system 40 in S217 (S442). The scan setting screen displayed on the display portion 32 in S442 is similar to the scan setting screen 160 (see FIG. 21).

Next, the cloud storage usage portion 37*a* specifies the initial values of the setting values in the scan setting screen that is being displayed on the display portion 32 as the setting values for scanning to be executed (S443).

Upon ending the processing of S443, the cloud storage usage portion 37*a* updates the specified setting values for scanning to be executed every time the setting values are changed in the scan setting screen that is being displayed on the display portion 32 (S444).

When the "scan" button in the scan setting screen that is being displayed on the display portion 32 is pressed after the processing of S443 is ended, the cloud storage usage portion 37*a* executes scanning by the scanner 34 using the specified setting values for scanning to be executed (S445).

Upon ending the processing of S445, the cloud storage usage portion 37*a* uploads a file generated by the scanning to the folder that is the upload destination specified in S441 in the cloud storage service 50 associated with the "scan now" button 131*d* in the action button display information notified from the display information generation system 40 in S217 (S446). It is noted that when a file having the same file name as the file name designated in the scan setting screen already exists in the upload destination, the cloud storage service 50 may automatically set the file name of the file uploaded in S446 so as not to overlap with the file name of the file already existing in the upload destination.

Upon completing the upload in S446, the cloud storage service 50 notifies the image forming apparatus 30 of the completion of the upload (S447).

Next, operations of the system 10 in a case where the "scan now" button is pressed in the home screen 110 (see FIG. 14) will be described.

Figure 26:
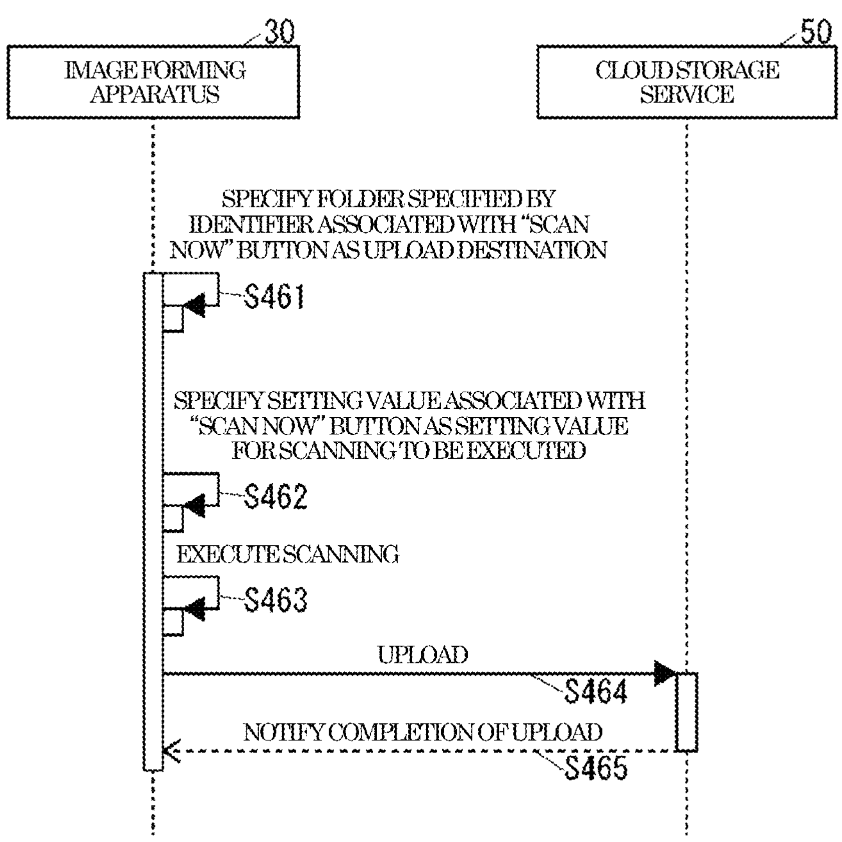
FIG. 26 is an operation sequence diagram of the system shown in FIG. 1 in a case where a "scan now" button is pressed in the home screen.

FIG. 26 is an operation sequence diagram of the system 10 in the case where the "scan now" button is pressed in the home screen 110.

In descriptions below, a case where the "scan now" button 131*d* (see FIG. 14) is pressed in the home screen 110 will be described as an example.

When the "scan now" button 131*d* is pressed in the home screen 110, the cloud storage usage portion 37*a* of the image forming apparatus 30 specifies, as the upload destination, a folder specified by an identifier associated with the "scan now" button 131*d* in the action button display information notified from the display information generation system 40 in S217 (see FIG. 8) as shown in FIG. 26 (S461).

Next, the cloud storage usage portion 37*a* specifies the setting values associated with the "scan now" button 131*d* in the action button display information notified from the display information generation system 40 in S217 as the setting values for scanning to be executed (S462).

Next, the cloud storage usage portion 37*a* executes scanning by the scanner 34 using the specified setting values for scanning to be executed (S463).

Next, the cloud storage usage portion 37*a* uploads a file generated by the scanning to the folder that is the upload destination specified in S461 in the cloud storage service 50 associated with the "scan now" button 131*d* in the action button display information notified from the display information generation system 40 in S217 (S464). It is noted that the cloud storage service 50 may automatically set the file name of the file uploaded in S464 so as not to overlap with the file name of the file already existing in the upload destination.

Upon completing the upload in S464, the cloud storage service 50 notifies the image forming apparatus 30 of the completion of the upload (S465).

Next, operations of the system 10 in a case where the "open folder" button is pressed in the home screen 110 (see FIG. 14) will be described.

Figure 27:
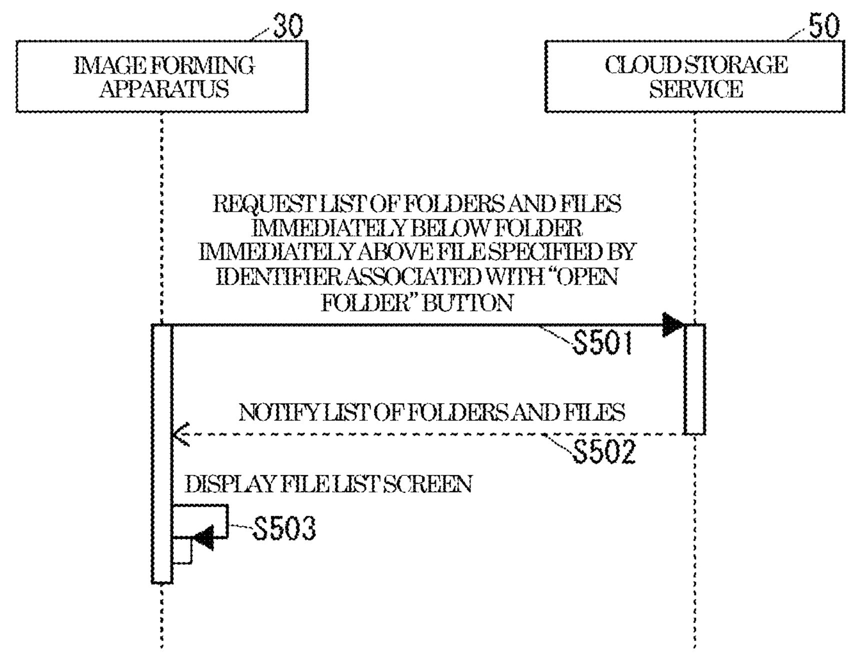
FIG. 27 is an operation sequence diagram of the system shown in FIG. 1 in a case where an "open file" button is pressed in the home screen.

FIG. 27 is an operation sequence diagram of the system 10 in the case where the "open folder" button is pressed in the home screen 110.

In descriptions below, a case where the "open folder" button 132*b* (see FIG. 14) is pressed in the home screen 110 will be described as an example.

When the "open folder" button 132*b* is pressed in the home screen 110, the cloud storage usage portion 37*a* of the image forming apparatus 30 requests the cloud storage service 50 associated with the "open folder" button 132*b* in the action button display information notified from the display information generation system 40 in S217 (see FIG. 8) for a list of folders and files immediately below a folder immediately above a file specified by an identifier associated with the "open folder" button 132*b* in the action button display information notified from the display information generation system 40 in S217 as shown in FIG. 27 (S501).

Upon receiving the request in S501, the cloud storage service 50 notifies the image forming apparatus 30 of the list requested in S501 (S502).

Upon receiving the notification in S502, the cloud storage usage portion 37*a* of the image forming apparatus 30 displays a file list screen that shows the list notified in S502 on the display portion 32 (S503). The file list screen displayed in S503 is, for example, a file list screen similar to the file list screen 140 shown in FIG. 16 or the file list screen 150 shown in FIG. 19.

Next, operations of the system 10 in a case where the "to print setting" button is pressed in the home screen 110 (see FIG. 14) will be described.

Figure 28:
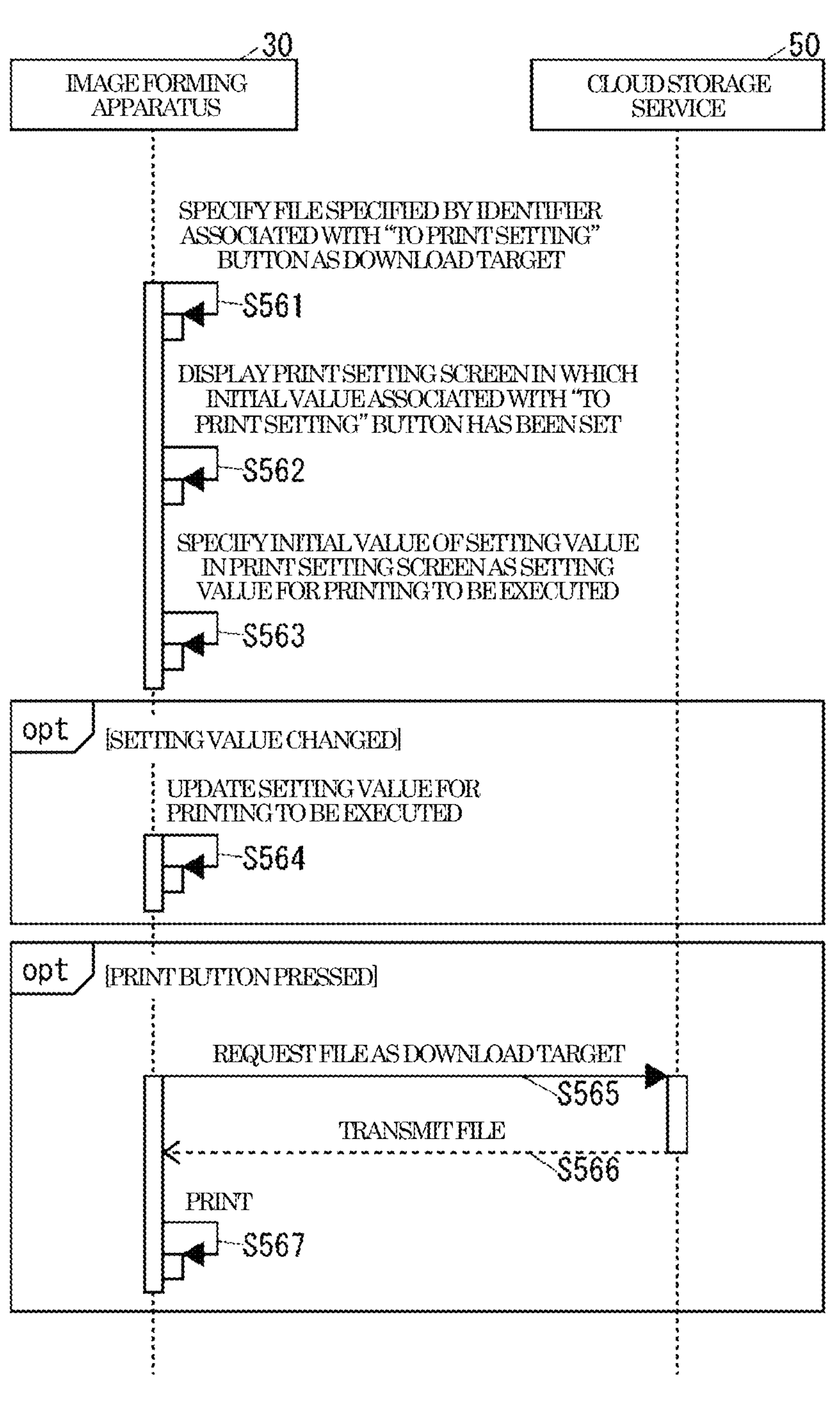
FIG. 28 is an operation sequence diagram of the system shown in FIG. 1 in a case where a "to print setting" button is pressed in the home screen.

FIG. 28 is an operation sequence diagram of the system 10 in the case where the "to print setting" button is pressed in the home screen 110.

In descriptions below, a case where the "to print setting" button 132*c* (see FIG. 14) is pressed in the home screen 110 will be described as an example.

When the "to print setting" button 132*c* is pressed in the home screen 110, the cloud storage usage portion 37*a* of the image forming apparatus 30 specifies, as the download target, a file specified by an identifier associated with the "to print setting" button 132*c* in the action button display information notified from the display information generation system 40 in S217 (see FIG. 8) as shown in FIG. 28 (S561).

Next, the cloud storage usage portion 37*a* displays, on the display portion 32, a print setting screen set with the initial values associated with the "to print setting" button 132*c* in the action button display information notified from the display information generation system 40 in S217 (S562). The print setting screen displayed on the display portion 32 in S562 is similar to the print setting screen 170 (see FIG. 23).

Next, the cloud storage usage portion 37*a* specifies the initial values in the print setting screen that is being displayed on the display portion 32 as the setting values for printing to be executed (S563).

Upon ending the processing of S563, the cloud storage usage portion 37*a* updates the specified setting values for printing to be executed every time the setting values are changed in the print setting screen that is being displayed on the display portion 32 (S564).

When the "print" button is pressed in the print setting screen that is being displayed on the display portion 32 after the processing of S563 is ended, the cloud storage usage portion 37*a* requests the cloud storage service 50 associated with the "to print setting" button 132*c* in the action button display information notified from the display information generation system 40 in S217 for the file that is the download target specified in S561 (S565).

Upon receiving the request in S565, the cloud storage service 50 transmits the file requested in S565 to the image forming apparatus 30 (S566).

Upon receiving the file transmitted from the cloud storage service 50 in S566, the cloud storage usage portion 37*a* prints the received file by the printer 33 using the specified setting values for printing to be executed (S567).

Next, operations of the system 10 in a case where the "print now" button is pressed in the home screen 110 (see FIG. 14) will be described.

Figure 29:
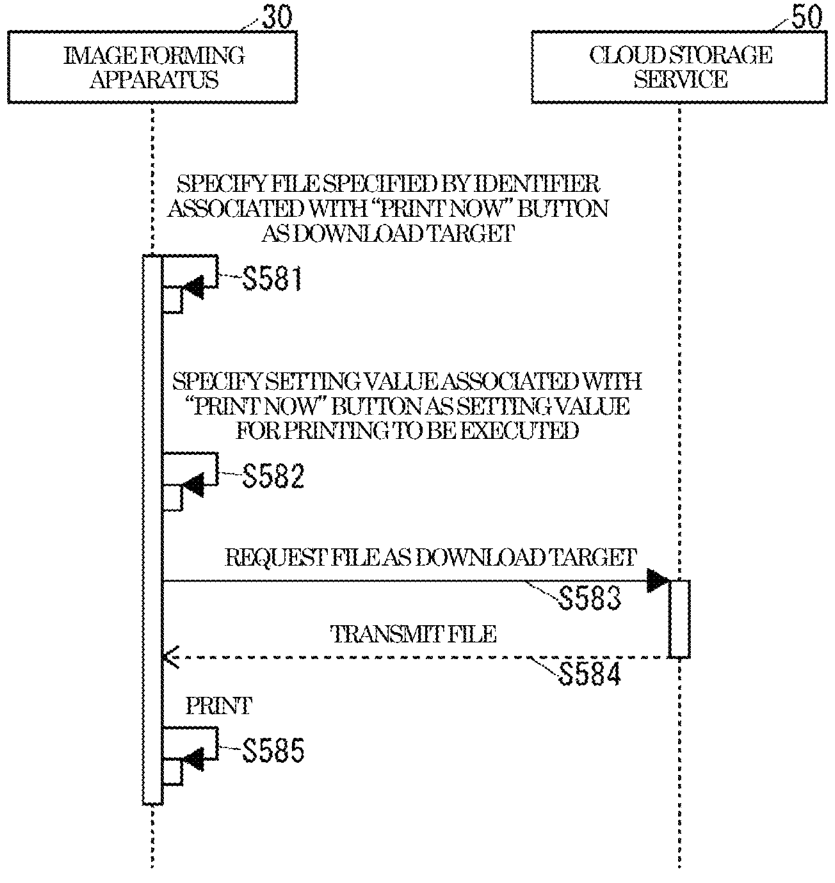
FIG. 29 is an operation sequence diagram of the system shown in FIG. 1 in a case where a "print now" button is pressed in the home screen.

FIG. 29 is an operation sequence diagram of the system 10 in the case where the "print now" button is pressed in the home screen 110.

In descriptions below, a case where the "print now" button 132*d* (see FIG. 14) is pressed in the home screen 110 will be described as an example.

When the "print now" button 132*d* is pressed in the home screen 110, the cloud storage usage portion 37*a* of the image forming apparatus 30 specifies, as the download target, a file specified by an identifier associated with the "print now" button 132*d* in the action button display information notified from the display information generation system 40 in S217 (see FIG. 8) as shown in FIG. 29 (S581).

Next, the cloud storage usage portion 37*a* specifies, as the setting values for printing to be executed, the setting values associated with the "print now" button 132*d* in the action button display information notified from the display information generation system 40 in S217 (S582).

Next, the cloud storage usage portion 37*a* requests the cloud storage service 50 associated with the "print now" button 132*d* in the action button display information notified from the display information generation system 40 in S217 for the file that is the download target specified in S581 (S583).

Upon receiving the request in S583, the cloud storage service 50 transmits the file requested in S583 to the image forming apparatus 30 (S584).

Upon receiving the file transmitted from the cloud storage service 50 in S584, the cloud storage usage portion 37*a* prints the received file by the printer 33 using the specified setting values for printing to be executed (S585).

Next, operations of the system 10 when changing the exclusion rule information will be described.

Figure 30:
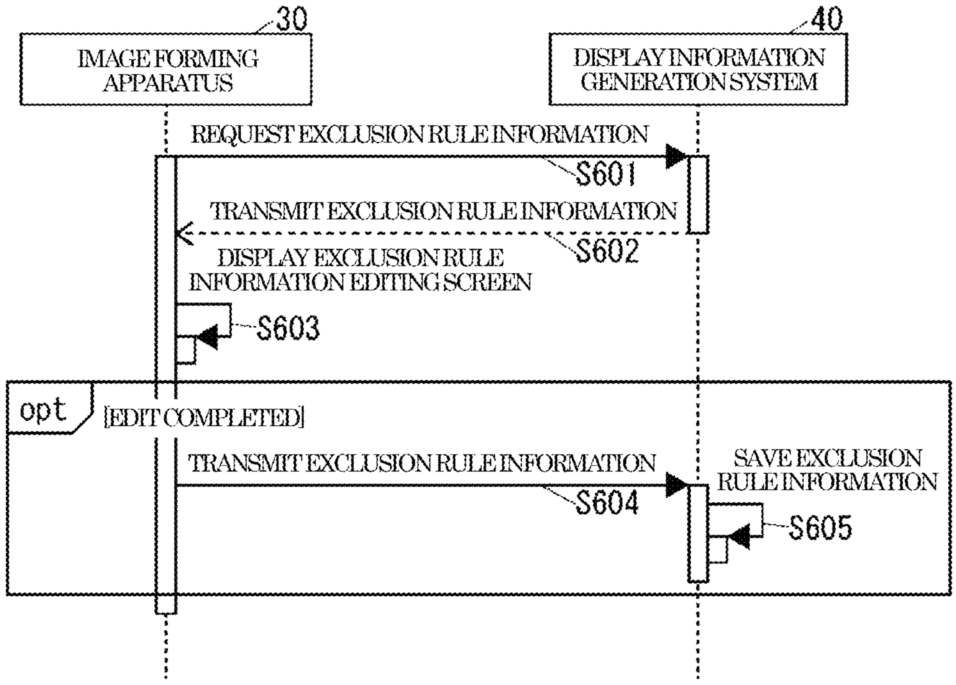
FIG. 30 is an operation sequence diagram of the system shown in FIG. 1 when changing the exclusion rule information.

FIG. 30 is an operation sequence diagram of the system 10 when changing the exclusion rule information.

The user can instruct the image forming apparatus 30 to edit the exclusion rule information via the operation portion 31 of the image forming apparatus 30. When instructed by the logged-in user to edit the exclusion rule information, the cloud storage usage portion 37*a* of the image forming apparatus 30 requests the display information generation system 40 for the exclusion rule information of the logged-in user as shown in FIG. 30 (S601).

Upon receiving the request in S601, the rule changing portion 45*f* of the display information generation system 40 transmits the exclusion rule information requested in S601 to the image forming apparatus 30 (S602).

Upon receiving the exclusion rule information transmitted by the display information generation system 40 in S602, the cloud storage usage portion 37*a* of the image forming apparatus 30 displays a screen for editing the received exclusion rule information (hereinafter, will be referred to as an "exclusion rule information editing screen") on the display portion 32 (S603). In the exclusion rule information editing screen displayed on the display portion 32 in S603, the exclusion rule information transmitted by the display information generation system 40 in S602 is displayed. The user can edit the exclusion rule information displayed in the exclusion rule information editing screen via the operation portion 31.

When editing of the exclusion rule information displayed in the exclusion rule information editing screen is completed after the processing of S603 is ended, the cloud storage usage portion 37*a* transmits the edited exclusion rule information to the display information generation system 40 (S604).

Upon receiving the exclusion rule information transmitted by the image forming apparatus 30 in S604, the rule changing portion 45*f* of the display information generation system 40 saves the received exclusion rule information as the exclusion rule information of the logged-in user (S605).

Heretofore, the case where the user changes the exclusion rule information by accessing the display information generation system 40 via the image forming apparatus 30 has been described. However, the same holds true for a case where the user changes the exclusion rule information by accessing the display information generation system 40 via a computer such as a PC (not shown).

Next, operations of the system 10 when changing the conversion rule information will be described.

Figure 31:
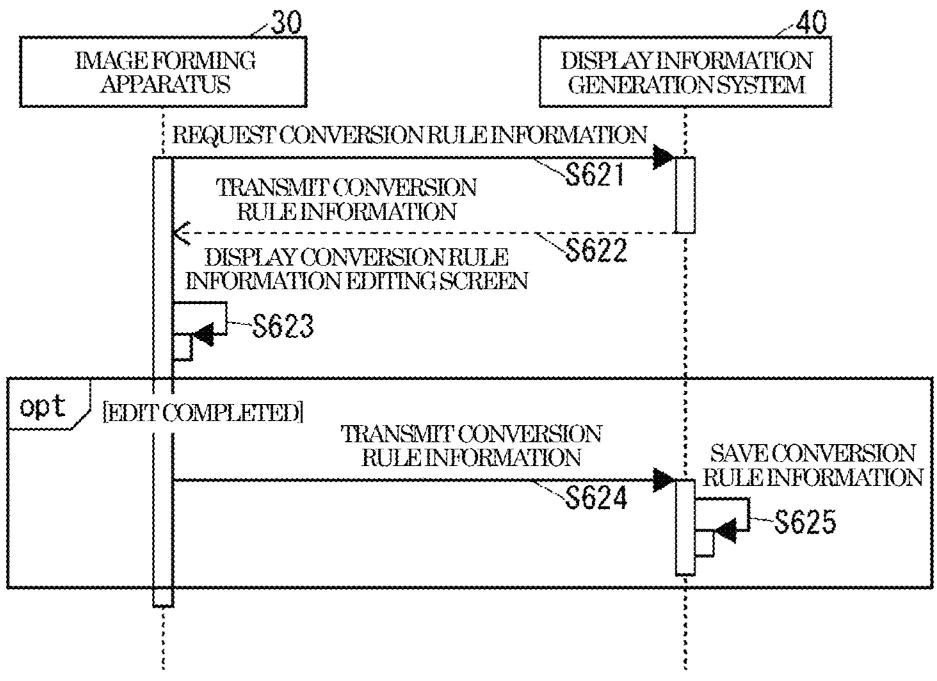
FIG. 31 is an operation sequence diagram of the system shown in FIG. 1 when changing the conversion rule information.

FIG. 31 is an operation sequence diagram of the system 10 when changing the conversion rule information.

The user can instruct the image forming apparatus 30 to edit the conversion rule information via the operation portion 31 of the image forming apparatus 30. When instructed by the logged-in user to edit the conversion rule information, the cloud storage usage portion 37*a* of the image forming apparatus 30 requests the display information generation system 40 for the conversion rule information of the logged-in user as shown in FIG. 31 (S621).

Upon receiving the request in S621, the rule changing portion 45*f* of the display information generation system 40 transmits the conversion rule information requested in S621 to the image forming apparatus 30 (S622).

Upon receiving the conversion rule information transmitted by the display information generation system 40 in S622, the cloud storage usage portion 37*a* of the image forming apparatus 30 displays a screen for editing the received conversion rule information (hereinafter, will be referred to as an "conversion rule information editing screen") on the display portion 32 (S623). In the conversion rule information editing screen displayed on the display portion 32 in S623, the conversion rule information transmitted by the display information generation system 40 in S622 is displayed. The user can edit the conversion rule information displayed in the conversion rule information editing screen via the operation portion 31.

When editing of the conversion rule information displayed in the conversion rule information editing screen is completed after the processing of S623 is ended, the cloud storage usage portion 37*a* transmits the edited conversion rule information to the display information generation system 40 (S624).

Upon receiving the conversion rule information transmitted by the image forming apparatus 30 in S624, the rule changing portion 45*f* of the display information generation system 40 saves the received conversion rule information as the conversion rule information of the logged-in user (S625).

It is noted that the conversion rule information includes the "initial setting" that shows the initial values of the setting values for printing in the print setting screen as the type of the action parameter for the "print setting screen display operation", includes the "setting" that shows the setting values for printing as the type of the action parameter for the "immediate print operation", includes the "initial setting" that shows the initial values of the setting values for scanning in the scan setting screen as the type of the action parameter for the "scan setting screen display operation", and includes the "setting" that shows the setting values for scanning as the type of the action parameter for the "immediate scan operation". Accordingly, the rule changing portion 45*f* of the display information generation system 40 configures a setting value acceptance portion which accepts these setting values and initial values.

Heretofore, the case where the user changes the conversion rule information by accessing the display information generation system 40 via the image forming apparatus 30 has been described. However, the same holds true for a case where the user changes the conversion rule information by accessing the display information generation system 40 via a computer such as a PC (not shown).

As described above, since the display information generation system 40 generates action button display information for causing the image forming apparatus 30 to display an action button for causing the image forming apparatus 30 to execute an action for each combination of the target of the shortcut function of the cloud storage service out of the files and folders managed by the cloud storage service and the action type (see S233 and FIG. 13), the action button can be displayed by the image forming apparatus 30 for each combination of the target of the shortcut function and the action type (see S218 and FIG. 14).

In the image forming system 20, since the action button for causing the image forming apparatus 30 to execute an action is displayed by the image forming apparatus 30 for each combination of the target of the shortcut function of the cloud storage service out of the files and folders managed by the cloud storage service and the action type (see S218 and FIG. 14), various actions can be executed with just one click, with the result that the operability in the image forming apparatus 30 can be improved.

Since the image forming apparatus 30 is capable of simultaneously displaying the action buttons for the plurality of cloud storage services in the image forming system 20 (see FIG. 14), the operability in the image forming apparatus 30 can be improved.

Since the display information generation system 40 changes the exclusion rule for excluding the shortcut information not used for generating the action button display information from the shortcut information acquired from the cloud storage service according to an instruction from outside (S605), customizability of the action buttons displayed by the image forming apparatus 30 can be improved, with the result that the operability in the image forming apparatus 30 can be improved.

Since the display information generation system 40 changes the conversion rule for converting the shortcut information into the action button display information according to an instruction from outside (S625), customizability of the action buttons displayed by the image forming apparatus 30 can be improved, with the result that the operability in the image forming apparatus 30 can be improved.

Since the display information generation system 40 can cause the image forming apparatus 30 to display the "open folder" button 132*b* (see FIG. 14) which is an action button for the same-folder file list display operation for displaying a file list screen that shows a list of folders and files immediately below a folder immediately above a file that is a target of the shortcut information in the cloud storage service (S218), the operability in the image forming apparatus 30 can be improved.

Since the display information generation system 40 can cause the image forming apparatus 30 to display the "to print setting" button 132*c* (see FIG. 14) which is an action button for the print setting screen display operation for displaying a print setting screen that accepts the setting values for printing of a file that is the target of the shortcut information (S218), the operability in the image forming apparatus 30 can be improved.

Since the display information generation system 40 incorporates the initial values of the setting values for printing in the print setting screen that have been accepted by the rule changing portion 45*f* in S625 into the action button display information for causing the image forming apparatus 30 to display the "to print setting" button 132*c* for causing the image forming apparatus 30 to execute the print setting screen display operation (S233), customizability of the print setting screen that accepts the setting values for printing of a file that is the target of the shortcut information can be improved, with the result that the operability in the image forming apparatus 30 can be improved.

Since the display information generation system 40 incorporates the setting values for printing for the immediate print operation that have been accepted by the rule changing portion 45*f* in S625 into the action button display information for causing the image forming apparatus 30 to display the "print now" button 132*d* (see FIG. 14) for causing the image forming apparatus 30 to execute the immediate print operation (S233), customizability of the immediate print operation to be executed by the image forming apparatus 30 can be improved, with the result that the operability in the image forming apparatus 30 can be improved.

Since the display information generation system 40 can cause the image forming apparatus 30 to display the "to scan setting" buttons 131*c* and 133*c* (see FIG. 14) which are each an action button for the scan setting screen display operation for displaying a scan setting screen that accepts the setting values for scanning for generating a file to be uploaded to a folder that is the target of the shortcut information, the operability in the image forming apparatus 30 can be improved.

Since the display information generation system 40 incorporates the initial values of the setting values for scanning in the scan setting screen that have been accepted by the rule changing portion 45*f* in S625 into the action button display information for causing the image forming apparatus 30 to display the "to scan setting" buttons 131*c* and 133*c* for causing the image forming apparatus 30 to execute the scan setting screen display operation (S233), customizability of the scan setting screen that accepts the setting values for scanning for generating a file to be uploaded to a folder that is the target of the shortcut information can be improved, with the result that the operability in the image forming apparatus 30 can be improved.

Since the display information generation system 40 incorporates the setting values for scanning for the immediate scan operation that have been accepted by the rule changing portion 45*f* in S625 into the action button display information for causing the image forming apparatus 30 to display the "scan now" buttons 131*d* and 133*d* (see FIG. 14) for causing the image forming apparatus 30 to execute the immediate scan operation (S233), customizability of the immediate scan operation to be executed by the image forming apparatus 30 can be improved, with the result that the operability in the image forming apparatus 30 can be improved.

Many documents generated in business activities in recent years are electronic documents. The electronic documents generated in business activities are managed by cloud storage services in many cases. Therefore, a target of the shortcut function in the cloud storage service is strongly related to a business activity of a user. Accordingly, by improving the operability in the image forming apparatus 30 according to the target of the shortcut function of the cloud storage service in the image forming system 20, the operability in the image forming apparatus 30 can be improved in a manner that fits with the business activity of the user. For example, during the business activities, a change in which a specific file or folder is used actively or a file or folder that has been used actively ceases to be used with time may occur, but in the image forming system 20, it is possible to cause the operability in the image forming apparatus 30 to follow such a change in the business activities.

Depending on users, there may be a bias in operations with respect to the image forming apparatus. For example, depending on users, a specific file or folder is accessed frequently, the same scan setting is used frequently, or the same print setting is used frequently. Such a bias largely depends on a unique business activity that the user performs. For example, in a case of a task of scanning order forms received from a large number of clients using the same scan setting and uploading all the scanned files to a specific folder, searching for a folder to be the upload destination each time or changing the scan setting each time is wasted work, and in addition, if the user manually executes the task each time, an operational error is apt to occur. However, in the image forming system 20, since the image forming apparatus 30 displays the action button for each combination of the target of the shortcut function of the cloud storage service out of the files and folders managed by the cloud storage service and the action type, a possibility that the user is caused to perform a wasted work can be reduced, with the result that the operational errors by the user can be reduced.

In the present embodiment, the image forming system 20 includes "color/monochrome", "document sheet size", and "duplex/one-side" as the setting items for scanning. However, as the setting items for scanning, the image forming system 20 may include other setting items in addition to "color/monochrome", "document sheet size", and "duplex/one-side" or in place of at least one of "color/monochrome", "document sheet size", and "duplex/one-side". For example, the image forming system 20 may include, as the setting item for scanning, at least one of "resolution" as a setting item that indicates a scanning resolution, "document sheet type" as a setting item that indicates a type of a document sheet such as a document sheet mainly including characters and a document sheet including both characters and photographs, for example, "document sheet orientation" as a setting item that indicates a document sheet setting direction with respect to the image forming apparatus 30, and "file format" as a setting item that indicates a format of a file generated by the scanning, such as PDF (Portable Document Format), TIFF (Tagged Image File Format), and JPEG (Joint Photographic Experts Group), for example.

In the present embodiment, the image forming system 20 includes "color/monochrome", "paper sheet size", and "duplex/one-side" as the setting items for printing. However, as the setting items for printing, the image forming system 20 may include other setting items in addition to "color/monochrome", "paper sheet size", and "duplex/one-side" or in place of at least one of "color/monochrome", "paper sheet size", and "duplex/one-side".

In the present embodiment, the display information generation system 40 sorts the action button display information in the order of the updated dates (S234). However, in the display information generation system 40, it may alternatively be possible to set whether or not to sort the action button display information in the order of the updated dates.

In the present embodiment, the shortcut information that the display information generation system 40 is notified from the cloud storage service includes the "updated date". However, the shortcut information that the display information generation system 40 is notified from the cloud storage service does not need to include the "updated date". When the "updated date" is not included in the shortcut information that the display information generation system 40 is notified from the cloud storage service, the processing in which the display information generation portion 45*d* of the display information generation system 40 sorts the action button display information in the order of the updated dates (S234) is not executed.

In the present embodiment, the display information generation system 40 executes the user authentication. However, the user authentication may be executed in a system other than the display information generation system 40, such as a user-authentication-dedicated server, for example.

The file management server according to the present disclosure is configured by the cloud storage service in the present embodiment. However, the file management server according to the present disclosure does not need to be the cloud storage service.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A display information generation system, comprising:

a shortcut information acquisition portion which acquires, from a file management server having a shortcut function, shortcut information as information for accessing at least one of a file and a folder managed by the file management server using the shortcut function; and a display information generation portion which generates, based on the shortcut information acquired by the shortcut information acquisition portion, display information as information for causing an image forming apparatus to display a to-be-operated portion for causing the image forming apparatus to execute a file management server usage operation as an operation for using at least one of the file and the folder, for each combination of a target of the shortcut function out of the file and the folder and a type of the file management server usage operation.

2. The display information generation system according to claim 1, wherein the display information generation portion converts the shortcut information acquired by the shortcut information acquisition portion into the display information based on a conversion rule as a rule for converting the shortcut information into the display information and the shortcut information acquired by the shortcut information acquisition portion, and the display information generation system comprises a rule changing portion which changes the conversion rule according to an instruction from outside.

3. The display information generation system according to claim 1, wherein the display information generation portion excludes the shortcut information not used for generating the display information from the shortcut information acquired by the shortcut information acquisition portion based on an exclusion rule as a rule for excluding the shortcut information not used for generating the display information from the shortcut information acquired by the shortcut information acquisition portion and the shortcut information acquired by the shortcut information acquisition portion, and the display information generation system comprises a rule changing portion which changes the exclusion rule according to an instruction from outside.

4. The display information generation system according to claim 1, wherein when a target of the shortcut information is the file, at least one of the file management server usage operations is a same-folder file list display operation as an operation for displaying a screen that shows a list of the folder and the file immediately below the folder immediately above the file that is the target of the shortcut information in the file management server.

5. The display information generation system according to claim 1, wherein when a target of the shortcut information is the file, at least one of the file management server usage operations is a print setting screen display operation as an operation for displaying a screen that accepts a setting value for printing of the file that is the target of the shortcut information.

6. The display information generation system according to claim 5, comprising a setting value acceptance portion which accepts an initial value of the setting value in the screen, wherein the display information generation portion incorporates the initial value accepted by the setting value acceptance portion into the display information for causing the image forming apparatus to display the to-be-operated portion for causing the image forming apparatus to execute the print setting screen display operation.

7. The display information generation system according to claim 1, wherein when a target of the shortcut information is the file, at least one of the file management server usage operations is an immediate print operation as an operation for downloading the file that is the target of the shortcut information from the file management server and printing the file downloaded from the file management server using a predetermined setting value for printing, the display information generation system comprises a setting value acceptance portion which accepts the setting value, and the display information generation portion incorporates the setting value accepted by the setting value acceptance portion into the display information for causing the image forming apparatus to display the to-be-operated portion for causing the image forming apparatus to execute the immediate print operation.

8. The display information generation system according to claim 1, wherein when a target of the shortcut information is the folder, at least one of the file management server usage operations is a scan setting screen display operation as an operation for displaying a screen that accepts a setting value for scanning for generating the file to be uploaded to the folder that is the target of the shortcut information.

9. The display information generation system according to claim 8, comprising a setting value acceptance portion which accepts an initial value of the setting value in the screen, wherein the display information generation portion incorporates the initial value accepted by the setting value acceptance portion into the display information for causing the image forming apparatus to display the to-be-operated portion for causing the image forming apparatus to execute the scan setting screen display operation.

10. The display information generation system according to claim 1, wherein when a target of the shortcut information is the folder, at least one of the file management server usage operations is an immediate scan operation as an operation for performing scanning using a predetermined setting value for scanning and uploading the file generated by the scanning to the folder that is the target of the shortcut information, the display information generation system comprises a setting value acceptance portion which accepts the setting value, and the display information generation portion incorporates the setting value accepted by the setting value acceptance portion into the display information for causing the image forming apparatus to display the to-be-operated portion for causing the image forming apparatus to execute the immediate scan operation.

11. A non-transitory computer-readable storage medium that stores a display information generation program which causes a computer to realize:

a shortcut information acquisition portion which acquires, from a file management server having a shortcut function, shortcut information as information for accessing at least one of a file and a folder managed by the file management server using the shortcut function; and a display information generation portion which generates, based on the shortcut information acquired by the shortcut information acquisition portion, display information as information for causing an image forming apparatus to display a to-be-operated portion for causing the image forming apparatus to execute a file management server usage operation as an operation for using at least one of the file and the folder, for each combination of a target of the shortcut function out of the file and the folder and a type of the file management server usage operation.

12. An image forming system, comprising:

an image forming apparatus;

a shortcut information acquisition portion which acquires, from a file management server having a shortcut function, shortcut information as information for accessing at least one of a file and a folder managed by the file management server using the shortcut function; and a display information generation portion which generates, based on the shortcut information acquired by the shortcut information acquisition portion, display information as information for causing the image forming apparatus to display a to-be-operated portion for causing the image forming apparatus to execute a file management server usage operation as an operation for using at least one of the file and the folder, wherein the image forming apparatus displays the to-be-operated portion for each combination of a target of the shortcut function out of the file and the folder and a type of the file management server usage operation based on the display information generated by the display information generation portion.

13. The image forming system according to claim 12, wherein the image forming apparatus is capable of simultaneously displaying the to-be-operated portions for a plurality of the file management servers.

* * * * *